US012142803B2

(12) United States Patent
Fonseca

(10) Patent No.: US 12,142,803 B2
(45) Date of Patent: Nov. 12, 2024

(54) WAVEGUIDE COMPONENT FOR USE IN AN ORTHOMODE JUNCTION OR AN ORTHOMODE TRANSDUCER

(71) Applicant: European Space Agency, Paris (FR)

(72) Inventor: Nelson Fonseca, AG Noordwijk (NL)

(73) Assignee: EUROPEAN SPACE AGENCY, Paris (FR)

( * ) Notice: Subject to any disclaimer, the term of this patent is extended or adjusted under 35 U.S.C. 154(b) by 301 days.

(21) Appl. No.: 17/769,650

(22) PCT Filed: Oct. 29, 2019

(86) PCT No.: PCT/EP2019/079563
§ 371 (c)(1),
(2) Date: Apr. 15, 2022

(87) PCT Pub. No.: WO2021/083498
PCT Pub. Date: May 6, 2021

(65) Prior Publication Data
US 2023/0246318 A1 Aug. 3, 2023

(51) Int. Cl.
*H01P 1/161* (2006.01)
*H01Q 13/02* (2006.01)

(52) U.S. Cl.
CPC ......... *H01P 1/161* (2013.01); *H01Q 13/0258* (2013.01)

(58) Field of Classification Search
CPC ........ H01P 1/161; H01P 1/2131; H01P 1/165; H01P 5/12; H01P 1/213; H01P 1/022; H01P 11/002; H01P 5/16; H01P 5/19; H01Q 13/0258; H01Q 21/064; H01Q 13/0241; H01Q 13/0225; H01Q 13/0283; H01Q 15/246; H01Q 21/0006
See application file for complete search history.

(56) References Cited

U.S. PATENT DOCUMENTS

| | | | | |
|---|---|---|---|---|
| 3,758,882 A | 9/1973 | Morz | | |
| 6,768,395 B1 * | 7/2004 | Speldrich | H01P 1/161 | 333/137 |
| 2010/0149058 A1 * | 6/2010 | Bosshard | H01P 1/161 | 343/756 |

FOREIGN PATENT DOCUMENTS

| | | |
|---|---|---|
| JP | S62-114503 U | 7/1987 |
| JP | 2001-102853 A | 4/2001 |

(Continued)

OTHER PUBLICATIONS

Patent Cooperation Treaty, International Search Report and The Written Opinion, Application No. PCT/EP2019/079563, dated Jun. 29, 2020, in 21 pages.

*Primary Examiner* — Lincoln D Donovan
*Assistant Examiner* — Tyler J Pereny
(74) *Attorney, Agent, or Firm* — Procopio, Cory, Hargreaves & Savitch LLP

(57) ABSTRACT

A waveguide component for an orthomode junction or an orthomode transducer includes a common waveguide with a longitudinal direction, the common waveguide includes at least a first portion and a second portion with different cross-sections, and two coupling probes, each arranged orthogonally to the longitudinal direction. The coupling probes are further arranged to couple to different polarization components of an electromagnetic field present in the common waveguide. The second portion of the common waveguide has a cross-section with at most two-fold rotational symmetry.

17 Claims, 16 Drawing Sheets

(56) References Cited

FOREIGN PATENT DOCUMENTS

| | | | |
|---|---|---|---|
| RU | 2703605 | C1 | 10/2019 |
| WO | 2010/009682 | A1 | 1/2010 |

* cited by examiner

WAVEGUIDE COMPONENT FOR USE IN AN ORTHOMODE JUNCTION OR AN ORTHOMODE TRANSDUCER

CROSS-REFERENCE TO RELATED APPLICATIONS

This application is US National Stage of International Patent Application PCT/EP2019/079563, filed Oct. 29, 2019, the contents of which are incorporated herein by reference.

TECHNICAL FIELD

This application relates to waveguide components for use in (or as) an orthomode junction or an orthomode transducer. Accordingly, the application also relates to compact waveguide orthomode junctions or orthomode transducers. The application further relates to corresponding methods of manufacturing waveguide components, orthomode transducers, and orthomode junctions.

BACKGROUND

Dual-polarization waveguide feed chains are a key subsystem in most radio frequency (RF) satellite payloads as well as reflector based ground antennas. For example, horn antennas, which are commonly used as part of reflector and array antenna sub-systems in RF satellite payloads because of their high performance and low insertion losses, are generally fed by orthomode transducers (OMT) or orthomode junctions (OMJ) enabling polarization diversity and/or multiple frequency operation, typically at least transmit (Tx) and receive (Rx).

Four-probe OMT designs were for a long time the preferred approach, as this symmetric design naturally provides high-order modes rejection. An example of a 4-probe OMT 1300 is shown in FIG. 13A and FIG. 13B. A typical approach to achieve high performance is to have the 4-probe OMT closer to the horn operating in the lower frequency band (e.g., Tx band for the onboard feed chains). This way, a simple reduction of the common waveguide cross-section can be used to filter out the lower frequency from propagating in the remaining part of the feed chain. This provides high filtering rejection from the Tx ports to the Rx ports in the Rx band. Including the probe filters and combining network (for linear or circular polarization operation), a typical 4-probe design will have a footprint diameter of about 5/6 wavelengths at the highest operating frequency (e.g., 50 to 60 mm at 30 GHz for broadband satellite antenna sub-systems).

However, with the advent of high throughput satellites (HTS) over recent years, requiring hundreds of beams (and hence, hundreds of feed chains), reducingfootprint of feed chains (and hence, OMTs) has become a prime issue.

There is a need for a scheme for reducing the footprint of waveguide components for feed chains without compromising RF performance. There is further need for a scheme for reducing the footprint of waveguide components for OMTs or OMJs without compromising RF performance.

SUMMARY

In view of some or all of these needs, the present disclosure proposes a waveguide component for use in (or as) an orthomode junction or an orthomode transducer, a method of manufacturing a waveguide component for use in (or as) an orthomode junction or an orthomode transducer, an orthomode junction, an orthomode transducer, and systems including the waveguide component, having the features of the respective independent claims.

An aspect of the disclosure relates to a waveguide component for use in (or as) an orthomode junction or an orthomode transducer. The waveguide component may be part of an antenna system, for example. The waveguide component may include a common waveguide with a longitudinal direction. The common waveguide may include at least a first portion and a second portion with different cross-sections. The cross-sectional plane may be orthogonal to the longitudinal direction. The waveguide component may further include two coupling probes. Each coupling probe may be arranged orthogonally to the longitudinal direction. The coupling probes may be further arranged to couple to different polarization components of an electromagnetic field present in the common waveguide. The coupling probes may couple to the different polarization components of the electromagnetic field through longitudinal coupling slots. The second portion of the common waveguide may have a cross-section with at most two-fold rotational symmetry (e.g., with a one-fold or a two-fold rotational symmetry). Thus, in some implementations, the second portion of the common waveguide may have a discrete rotational symmetry of order two. To be precise, a highest order of the discrete rotational symmetry of the (shape of the) cross-section may be given by two. In other words, the cross-section has 2-fold rotational symmetry, but does not have higher orders (especially not $2 \cdot n$) of rotational symmetry. The symmetry group of the cross-section thus is $C_2$, meaning that the cross-section is invariant under rotations by 180°, but not under rotations by less than 180°, such as 90°. For specific implementations, the cross-section of the second portion may also have a discrete rotational symmetry of order lower than 2, i.e. the second portion of the common waveguide may have a 1-fold rotational symmetry. The first portion of the common waveguide may be a conventional waveguide for dual polarization operation, for example.

Configured as described above, the proposed waveguide component features a two-probe design, which allows for a downsizing of the waveguide component (and thereby, of an OMT or OMJ comprising the waveguide component) when compared to the prior-art four-probe design. On the other hand, deterioration of RF performance that would otherwise result from the two-probe design is avoided by providing a common waveguide with an asymmetric portion (i.e., the second portion of the common waveguide). By appropriate choice of the shape (e.g., aspect ratio) and dimensions (e.g., longitudinal length) of the asymmetric portion, undesired cross-polarization and/or probe-to-probe coupling can be reduced or even suppressed. At this, the proposed design is complementary to alternative two-probe approaches for RF performance improvement, so that combining the proposed design with these approaches could provide further performance improvement. Moreover, the proposed design is compatible with dual-linear and dual-circular operation, extending its possible use. As the proposed waveguide component relies on conventional waveguide technology, it can be implemented (e.g., manufactured) in a simple and efficient manner.

In some embodiments, the cross-section of the second portion of the common waveguide may have two orthogonal symmetry axes. A dimension (e.g., extension, or length) of the cross-section of the second portion along one of the two orthogonal symmetry axes may be different from a dimension (e.g., extension, or length) of the cross-section along the other one of the two orthogonal symmetry axes.

In some embodiments, the first portion of the common waveguide may have a cross-section with a rotational symmetry of order 4 or a multiple (integer multiple) of 4. In other words, the first portion of the common waveguide may have at least four-fold rotational symmetry. For example, the cross-section of the second portion of the common waveguide may have the shape of a square or a circle. With such shape, the first portion of the common waveguide is suitable for dual polarization operation.

In some embodiments, the cross-section of the first portion of the common waveguide may have four symmetry axes that cross each other at the center of the cross-section and that are angularly spaced at 45 degrees from each other.

In some embodiments, the cross-section of the first portion of the common waveguide may have circular or square shape. The cross-section of the second portion of the common waveguide may have the shape of any one of an ellipse, a rhombus, a circle that is chamfered on both sides on one axis, a square that is chamfered on both sides on one axis, a circle with protrusions on both sides on one axis, or a square with protrusions on both sides on one axis. The protrusions may be ridges, for example. Accordingly, suitable shapes for the cross-section of the second portion of the common waveguide can be implemented in a simple manner.

In some embodiments, the waveguide component may include exactly two coupling probes. In particular, the waveguide component may not include four coupling probes. This implies (assuming an angle of approximately 90° between the coupling probes) that the coupling probe arrangement does not have discrete rotational symmetry of any order. On the other hand, using a two-probe design allows to provide a more compact waveguide component.

In some embodiments, the two coupling probes may be arranged such that they have a common symmetry plane orthogonal to the longitudinal direction of the common waveguide. In some embodiments, the common symmetry plane may intersect the common waveguide in either the first portion or the second portion. Accordingly, the asymmetric portion of the common waveguide may be flexibly arranged in a vicinity of the probing area.

Any undesired polarization component of the electromagnetic field or probe-to-probe coupling introduced by the two-probe design may be cancelled at a given frequency by appropriate dimensioning of the second portion of the common waveguide. This dimensioning of the second portion may include adjusting the shape of the cross-section, the longitudinal length and the location with respect to the probing area.

In some embodiments, the axes of the two coupling probes may be substantially orthogonal to each other. In some embodiments, the orthogonal symmetry axes of the cross-section of the second portion of the common waveguide may be rotated with respect to the axes of the coupling probes by (approximately) 45°.

In some embodiments, the common waveguide may be oriented relative to the coupling probes such that a longer one of the two orthogonal symmetry axes of the cross-section of the second portion of the common waveguide is arranged between the coupling probes. In this case, an aspect ratio of the two orthogonal symmetry axes of the second portion of the common waveguide and a longitudinal length of the second portion of the common waveguide may be chosen such that, for a given wave number of the electromagnetic field, an asymmetry of the orthogonal polarization components of the electromagnetic field introduced by the second portion of the common waveguide substantially cancels an undesired polarization component of the electromagnetic field introduced by the two-probe design of the waveguide component. Presence of the undesired orthogonal polarization components may be referred to as cross-polarization.

In some embodiments, the common waveguide may be oriented relative to the coupling probes such that a shorter one of the two orthogonal symmetry axes of the cross-section of the second portion of the common waveguide is arranged between the coupling probes. In this case, an aspect ratio of the two orthogonal symmetry axes of the second portion of the common waveguide and a longitudinal length of a second portion of the common waveguide may be chosen such that, for a given wave number of the electromagnetic field, an asymmetry of the orthogonal polarization components of the electromagnetic field introduced by a second portion of the common waveguide substantially cancels a probe-to-probe coupling of the electromagnetic field introduced by the two-probe design of the waveguide component.

Another aspect of the disclosure relates to an orthomode transducer. The orthomode transducer may include the waveguide component according to the above aspect or any of its embodiments. Further, the orthomode transducer may be configured to extract and/or excite the desired electromagnetic fields in the frequency band of operation.

Another aspect of the disclosure relates to an orthomode junction. The orthomode junction may include the waveguide component according to the above aspect or any of its embodiments. Further, the orthomode junction may be configured to extract and/or excite the desired electromagnetic fields in one of the frequency bands of operation, with the electromagnetic fields in remaining bands passing through the waveguide component substantially unaffected.

Another aspect of the disclosure relates to a system including the waveguide component according to the above aspect or any of its embodiments and an unbalanced coupler connected to the coupling probes. Simultaneously feeding the coupling probes with unbalanced amplitude and a phase shift of ±90° may allow to achieve left-hand or right-hand circularly polarized electric fields with enhanced cross-polarization discrimination and reduced probe-to-probe coupling. Simultaneously feeding the first and second probes with unbalanced amplitude and a phase shift of ±180° may allow to achieve horizontal and vertical linearly polarized electric fields with enhanced cross-polarization discrimination and reduced probe-to-probe coupling.

Another aspect of the disclosure relates to a system comprising the waveguide component according to the above aspect or any of its embodiments and filters connected to the coupling probes.

Yet another aspect of the disclosure relates to a method of manufacturing a waveguide component for use in an orthomode junction or an orthomode transducer. The method may include providing a common waveguide with a longitudinal direction. The common waveguide may include at least a first portion and a second portion with different cross-sections. The second portion of the common waveguide may have a cross-section with a two-fold rotational symmetry. The method may further include providing two coupling probes. The coupling probes may be provided to be arranged in a plane orthogonal to the longitudinal direction. Further, the coupling probes may be arranged to couple to different polarization components of an electromagnetic field present in the common waveguide.

It will be appreciated that apparatus features and method steps may be interchanged in many ways. In particular, the details of the disclosed apparatus (e.g., waveguide component) can be realized by the corresponding method of manufacturing the apparatus, and vice versa, as the skilled person will appreciate. Moreover, any of the above statements made with respect to the apparatus are understood to likewise apply to the corresponding method, and vice versa.

BRIEF DESCRIPTION OF THE FIGURES

Example embodiments of the disclosure are explained below with reference to the accompanying drawings, wherein FIG. 1 schematically illustrates an example of a cross-section through a portion of a waveguide component according to embodiments of the disclosure, FIG. 2A to FIG. 2D schematically illustrate further examples of a cross-section through a portion of a waveguide component according to embodiments of the disclosure, FIG. 3A schematically illustrates an example of a waveguide component according to embodiments of the disclosure.

DETAILED DESCRIPTION

Several approaches for reducing footprint of an OMT and/or OMJ are feasible. In the case of an OMJ with at least two operating frequencies, one solution is to first extract the higher operating frequency rather than the lower one. This enables more compact probe filters and combining network, hence reduced footprint. The drawback is that this approach requires a high pass filter in the common waveguide section, resulting in a length penalty and limited mass saving compared to a more conventional design.

Another solution, used in both OMT and OMJ designs, is to reduce the number of probes. The resulting asymmetry with respect to the reference axes defined by the two orthogonal electric field polarization components results in some degradation of the Cross-Polarization Discrimination (XPD). Attempts to minimize the impact of this asymmetry include designs in which the two probes operate at the same frequency at a different location. While those solutions may be suitable for dual-linear operation, operation in dual-circular polarization requires to add a polarizer along the common waveguide, resulting again in a longitudinal length penalty.

Solutions enabling both dual-linear and dual-circular polarization are based on collocated two-probe designs. A simple two-probe design without any correction technique has poor XPD, typically less than 20 dB, while most satellite missions require at least 30 dB or better. Attempts to recover the XPD performance include designs having "dummy" probes on the opposite side of the operating probes so has to maintain the design symmetry in the common waveguide. This may provide high performance but is not as efficient in terms of footprint reduction.

Figure 12A:
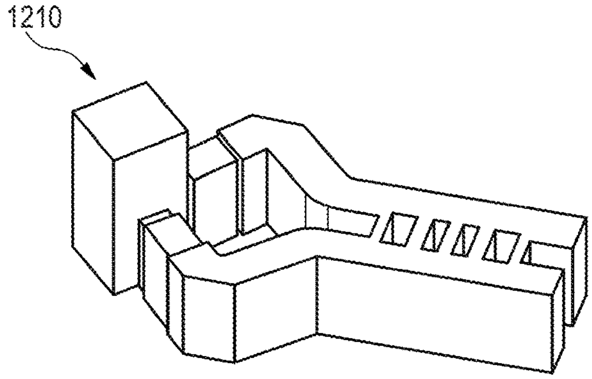
FIG. 12C to FIG. 12E are diagrams illustrating the RF performances of these OMTs, and FIG. 12F schematically illustrates a port definition for the coupler, and FIG. 13A and FIG. 13B schematically illustrates an example of an OMJ with a four-probe design.

Solutions based on only two probes include using an unbalanced coupler design to compensate for the XPD degradation or changing the angle between the two-probes, which are then no longer orthogonal. FIG. 12A illustrates an example of a conventional two-probe OMT 1200 that is fed by an unbalanced directional coupler to compensate for the XPD. Although those solutions are compact, they usually result in compromised RF performance (e.g., higher return loss than less compact design).

Despite the above efforts, further improvement of RF performance of OMTs or OMJs without penalty in physical dimensions is desirable.

In the following, example embodiments of the disclosure will be described with reference to the appended figures. Identical elements in the figures may be indicated by identical reference numbers, and repeated description thereof may be omitted for reasons of conciseness.

All the above-described solutions involve a common waveguide having a cross-section with a discrete rotational symmetry of at least order 4 (e.g., circular, square, etc.). This is to provide similar operation for the two orthogonal components of the coupled electric field, so as to ensure broadband operation. A key aspect of the present disclosure is to introduce some asymmetry in the shape of at least one portion of the common waveguide.

Broadly speaking, the present disclosure proposes a two-probe waveguide component for use in an orthomode transducer or orthomode junction which provides high XPD thanks to a partly asymmetric common waveguide cross-section. This design may be combined with other techniques for further enhancing the feed chain performance while keeping a compact design.

An example implementation of the present disclosure relates to a two-probe orthomode transducer having a cross-section with two axes of symmetry at 90 degrees with respect to each other, and at approximately 45 degrees with respect to the reference axes defined by the two probes, wherein the shape of the cross-section is (slightly) different along those two axes of symmetry. The two-probe orthomode transducer can have an elliptical or rhomboidal cross-section, for example. Alternatively, it can have a chamfered circular or chamfered square cross-section, for example.

Another example implementation of the present disclosure relates to a two-probe orthomode transducer having a circular or square cross-section with ridges along one axis at approximately 45 degrees with respect to the reference axes defined by the two probes.

Combinations of the shapes described above could also be considered for some specific applications, as would be obvious for a person skilled in the art.

In general, the present disclosure relates to a waveguide component, for example for use in an OMT or OMJ. The waveguide component may be part of an antenna system, for example.

Specifically, a waveguide component 100 according to embodiments of the disclosure comprises a common waveguide with a longitudinal direction, and two coupling probes 40, 45. It is understood that the waveguide component 100 relates to a two-probe design.

Figure 1:
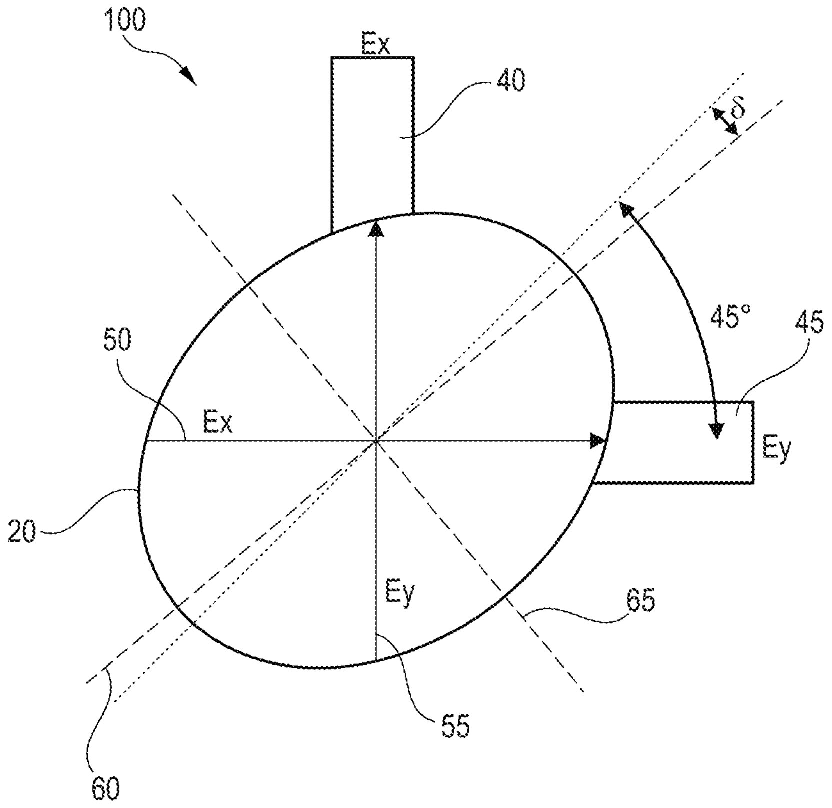

The common waveguide includes (at least) a first portion 10 and a second portion 20 with different cross-sections. It is understood that the common waveguide may include additional portions in addition to the first and second portions 10, 20. The second portion 20 of the common waveguide has a cross-section with a two-fold rotational symmetry, or equivalently, a discrete rotational symmetry of order two. This is understood to mean that a highest order of the discrete rotational symmetry of the (shape of the) cross-section is given by two. In other words, the cross-section has at most two-fold rotational symmetry, meaning rotational symmetry of order one or two, but does not have higher orders (especially 2·n) of rotational symmetry. Accordingly, the symmetry group of the cross-section is at most $C_2$ (e.g., $C_1$ or $C_2$) and the cross-section is invariant under rotations by 180° or 360°, but not under rotations by less than 180°, such as 90°. In some implementations, the second portion of the common waveguide may also have a discrete rotational symmetry of order lower than two, i.e. the second portion of the common waveguide may have a 1-fold rotational symmetry. Nevertheless, without intended limitation, examples may be shown for second portions of the common waveguide with a discrete rotational symmetry of order two. A cross-section of the second portion 20 of the common waveguide is schematically shown in FIG. 1. As can be seen from this figure, the cross-section of the second portion 20 of the common waveguide has two orthogonal symmetry axes 60, 65. The extensions (lengths) of the cross section along the two orthogonal symmetry axes 60, 65 may be different from each other.

Each of the two coupling probes 40, 45 is arranged orthogonally to the longitudinal direction of the common waveguide, orthogonal to the plane of representation in FIG. 1. Further, the coupling probes 40, 45 are arranged to couple to different polarization components of an electromagnetic field present in the common waveguide, for example through longitudinal coupling slots. A first probe 40 among the two coupling probes may couple to the $E_x$ component 50 of the electromagnetic field and a second probe 45 among the two coupling probes may couple to the Eycomponent 55 of the electromagnetic field. The axes of the two coupling probes 40, 45 may be substantially orthogonal to each other. In addition, the two coupling probes 40, 45 may be arranged such that they have a common symmetry plane orthogonal to the longitudinal direction of the common waveguide, commonly referred to as the E-plane or H-plane of the two waveguide probes depending on the orientation of the electric field in said probes.

The orthogonal symmetry axes 60, 65 of the cross-section of the second portion 20 of the common waveguide are rotated with respect to the axes of the coupling probes 40, 45 by 45°. In some implementations, there may be a slight tilt 6 from an orientation in which the two orthogonal symmetry axes 60, 65 are rotated with respect to the axes of the coupling probes 40, 45 by exactly 45°. This tilt 6 may be tuned to optimize the RF performance of the waveguide component, as will be described in more detail below.

As noted above, the extension of the cross-section of the second portion 20 of the common waveguide along its two axes of symmetry may be different from each other. So to speak, the cross-section may be said to have a longer symmetry axis 60 (the symmetry axis alongwhich the extension of the cross-section is longer) and a shorter symmetry axis 65 (the symmetry axis along which the extension of the cross-section is shorter). The common waveguide may be oriented (relative to the coupling probes 40, 45) so that either of these symmetry axes passes between (or is arranged between) the two coupling probes 40, 45. Therein, different orientations of the common waveguide allow for achieving different optimization aims. For instance, having the longer symmetry axis 60 pass between the two coupling probes 40, 45 allows to tune the cross-sectional shape and longitudinal length of the second portion 20 of the common waveguide to cancel an undesired polarization component of the electromagnetic field (e.g., cross-polarization) introduced by the two-probe design of the waveguide component. On the other hand, having the shorter symmetry axis 65 pass between the two coupling probes 40, 45 allows to tune the cross-sectional shape and longitudinal length of the second portion 20 of the common waveguide to cancel a probe-to-probe coupling of the electromagnetic field introduced by the two-probe design of the waveguide component. Without intended limitation, the example of FIG. 1 shows a case in which the longer symmetry axis 60 passes between the two coupling probes 40, 45.

The first portion 10 of the common waveguide may be a conventional waveguide for dual polarization operation, for example. As such, the first portion 10 of the common waveguide may have a cross-section with a rotational symmetry of order 4 or a multiple of 4. This implies that the cross-section of the first portion 10 of the common waveguide has four symmetry axes that cross each other at the center of the cross-section and that are angularly spaced at 45 degrees from each other. In some implementations, the cross-section of the first portion 10 of the common waveguide may have circular or square shape.

Figure 2A:
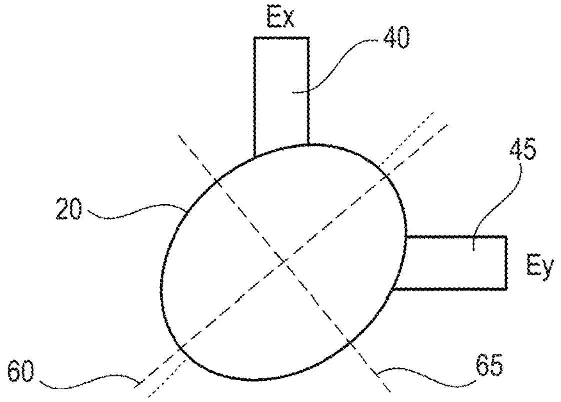
Figure 2B:
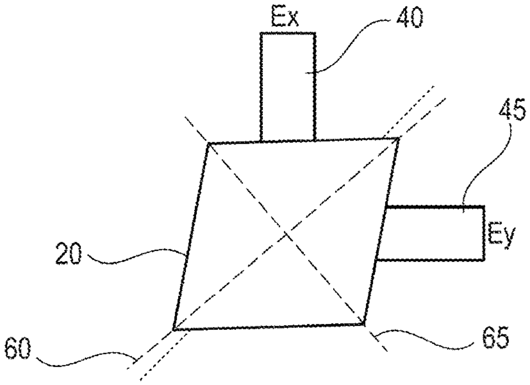
Figure 2C:
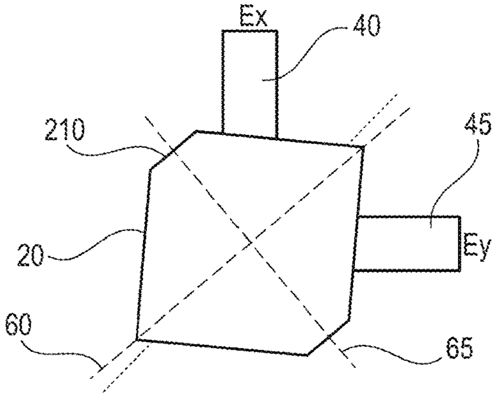
Figure 2D:
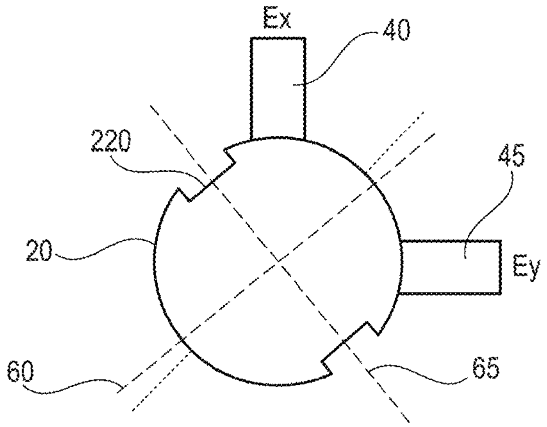

Non-limiting examples of the shape of the cross-section of the second portion 20 of the common waveguide are schematically illustrated in FIGS. 2A to 2D. FIG. 2A shows the example of a cross-section of the second portion 20 of the common waveguide that has the shape of an ellipse and FIG. 2B shows the example of a cross-section of the second portion 20 of the common waveguide that has the shape of a (non-square) rhombus. Asymmetry of the shape of the cross-section of the second portion 20 of the common waveguide may also be achieved by chamfering or grooving symmetrical shapes on both sides of one (symmetry) axis. In the example of FIG. 2C, the cross-section of the second portion 20 of the common waveguide has the shape of a square that is chamfered on both sides on one (symmetry) axis. As a modification thereof, the cross-section of the second portion 20 of the common waveguide may have the shape of a (non-square) rhombus that is chamfered on both sides on one (symmetry) axis. In the example of FIG. 2D the cross-section of the second portion 20 of the common waveguide has the shape of a circle with protrusions (e.g., ridges) towards the center of the cross-sectional shape on both sides on one (symmetry) axis. In addition to the above examples, asymmetry of the shape of the cross-section of the second portion 20 of the common waveguide may also be achieved by adding outward-facing protrusions to symmetrical shapes on both sides of one (symmetry) axis. In some such examples, the cross-section of the second portion 20 of the common waveguide may have the shape of a circle with protrusions on both sides on one (symmetry) axis, or of a square with protrusions on both sides on one (symmetry) axis. Further shapes of the cross-section of the second portion 20 of the common waveguide can be obtained by providing a combination of chamfers/grooves and protrusions/ridges to shapes such as ellipses, circles, squares and rhombuses (with chamfers/grooves on both sides on one axis and/or protrusions/ridges on both sides on another axis). In some such examples, the protrusions may be facing outwards. Further shapes of the cross-section of the second portion 20 of the common waveguide can also be obtained by applying chamfers/grooves or protrusions/ridges on both axes of symmetry, with identical dimensions for the chamfers or ridges on both sides on one axis but different dimensions with respect to the chamfers or ridges on the other axis. All the shapes of the cross-section of the second portion 20 mentioned above have exactly a two-fold rotational symmetry. Further shapes of the cross-section of the second portion 20 may include shapes similar to the ones above but without a two-fold rotational symmetry, i.e. no rotational symmetry (also referred to as one-fold rotational symmetry). For example, the cross-section of the second portion 20 of the waveguide component may have a square shape with a chamfer on one side only on one symmetry axis or a circular shape with a protrusion on one side only on one axis of symmetry.

The selection and dimensioning of the shape of the cross-section of the second portion 20 may be guided by integration constraints with other components having their respective waveguide cross-section and associated electrical characteristics. In particular, the cross-section may be selected such as to minimize impedance mismatch between different constituting components (e.g., horn antenna, septum polarizer, etc.) of a waveguide device.

The coupling probes can be arranged at either of the first and second portions 10, 20 of the common waveguide, or at a joining portion of the first and second portions 10, 20 of the common waveguide. For instance, the common symmetry plane of the two coupling probes 40, 45 (which is orthogonal to the longitudinal direction of the common waveguide) may intersect the common waveguide in either the first portion or the second portion or at the intersection between the first and second portion. In some implementations, the coupling probes can be arranged at any other portion of the common waveguide in vicinity or proximity to the second portion 20 of the common waveguide. Waveguide cross-sections as described above sustain two orthogonal fundamental modes with the main electric field components aligned with the symmetry axes and having slightly different propagation properties resulting from the asymmetry of the cross-section. By an adequate unbalance, which can be characterized by the aspect ratio of the cross-section and the longitudinal length of the second portion 20 of the common waveguide, it is possible to introduce a cross-polarization component which cancels the cross-polarization coupling or the probe-to-probe coupling resulting from the two-probe design.

In particular, for the longer symmetry axis 60 of the cross section of the second portion 20 of the common waveguide passing between the two coupling probes 40, 45, an aspect ratio of the (lengths of the) two orthogonal symmetry axes 60, 65 of the second portion 20 of the common waveguide and a longitudinal length of the second portion 20 of the common waveguide can be chosen (e.g., tuned) such that, for a given wave number of the electromagnetic field, an asymmetry of the orthogonal polarization components of the electromagnetic field introduced by the second portion of the common waveguide (substantially) cancels an undesired polarization component of the electromagnetic field introduced by the two-probe design of the waveguide component. Therein, the presence of the undesired orthogonal polarization components may be referred to as cross-polarization.

As another use case, for the shorter symmetry axis 65 of the cross section of the second portion 20 of the common waveguide passing between the two coupling probes 40, 45, an aspect ratio of the (lengths of the) two orthogonal symmetry axes 60, 65 of the second portion 20 of the common waveguide and a longitudinal length of the second portion 20 of the common waveguide can be chosen (e.g., tuned) such that, for a given wave number of the electromagnetic field, an asymmetry of the orthogonal polarization components of the electromagnetic field introduced by the second portion of the common waveguide (substantially) cancels a probe-to-probe coupling of the electromagnetic field introduced by the two-probe design of the waveguide component.

While these descriptions refer to a simplified use of the disclosed waveguide component where one specific property is tuned at a time, further improvements may be obtained by combining additional features to the waveguide component. For instance, the waveguide component 100 may have more than one common waveguide portion with dimensional characteristics similar to those of the second portion 20. As an example, the waveguide component may have the second portion 20 of the common waveguide located in the coupling area and having the shorter symmetry axis 65 of the cross-section pass between the two probes 40, 45 and a third portion at a distance from the coupling area and having the longer symmetry axis 60 of the cross-section pass between the two probes 40, 45. Such configurations may provide simultaneously an improvement in XPD and a reduction in probe-to-probe coupling. Other combinations are possible that would be obvious for a person skilled in the art.

Interestingly, the above scheme for enhanced RF properties without compromising dimensions proposed by the present disclosure is complementary to alternative approaches. For example, the proposed scheme may be combined with an unbalanced coupler or two non-orthogonal probes. This is expected to provide further performance improvement and in particular, to extend the operating bandwidth with a high XPD (or low axial ratio in the case of circular polarization operation) and lower return loss, which is directly linked to probe-to-probe coupling. Moreover, the proposed scheme is also compatible with dual-linear and dual-circular operation, as well as dual-band and multi-band operation, extending its possible use.

As the proposed waveguide component design relies on conventional waveguide technology, its implementation is expected to be straightforward. The resulting waveguide component (e.g., OMT or OMJ) may be manufactured using conventional manufacturing techniques, as well as alternative manufacturing techniques, such as additive layer manufacturing, for example.

In summary, the proposed waveguide component features a two-probe design, which allows for a downsizing of the component (and thereby, of an OMT or OMJ comprising the waveguide component). On the other hand, deterioration of RF performance that would otherwise result from the two-probe design is avoided by providing a common waveguide with an asymmetric portion (i.e., the second portion of the common waveguide). By appropriate choice of the shape and dimensions of the asymmetric portion, undesired cross-polarization and/or probe-to-probe coupling can be reduced or even cancelled.

Next, technical results of the waveguide component design proposed by present disclosure will be described.

The proposed waveguide component design has been validated using a simplified Finite Element Method (FEM) model of a waveguide component according to embodiments of the disclosure acting as an OMT. This is sufficient to demonstrate the operation principle. Further improvements of RF performance are expected to be achievable by adding adequate filtering and matching sections.

Figure 3A:
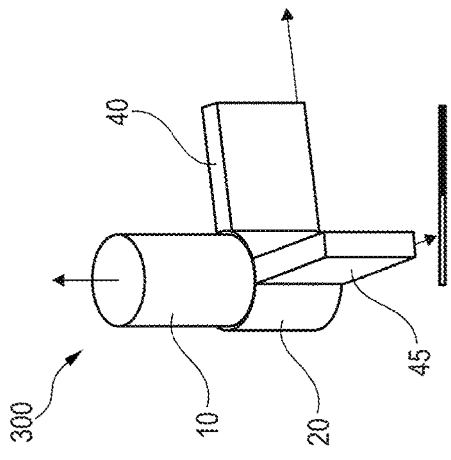
FIG. 3B to FIG. 3D are diagrams illustrating an RF performance of the waveguide component of FIG. 3A, FIG. 4A schematically illustrates another example of a waveguide component according to embodiments of the disclosure.
Figure 3B:
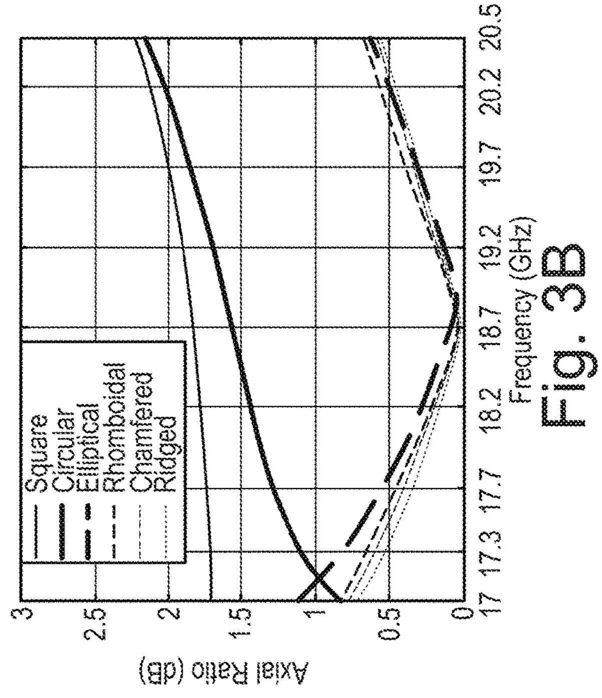
Figure 3C:
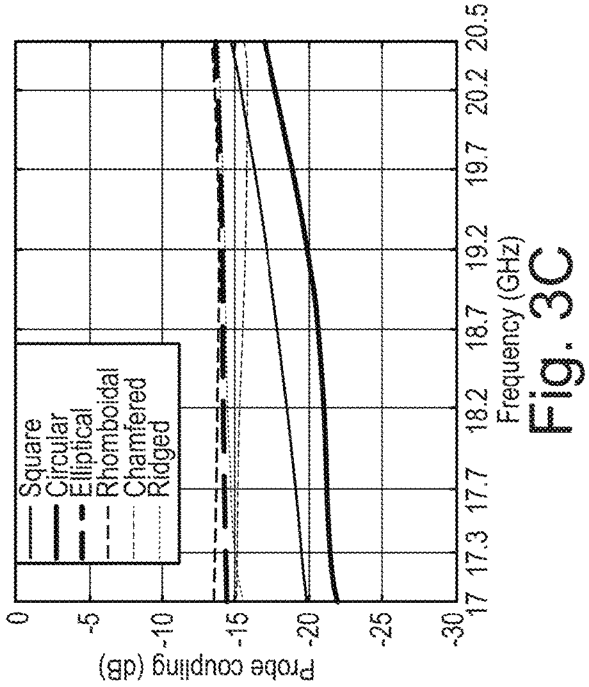
Figure 3D:
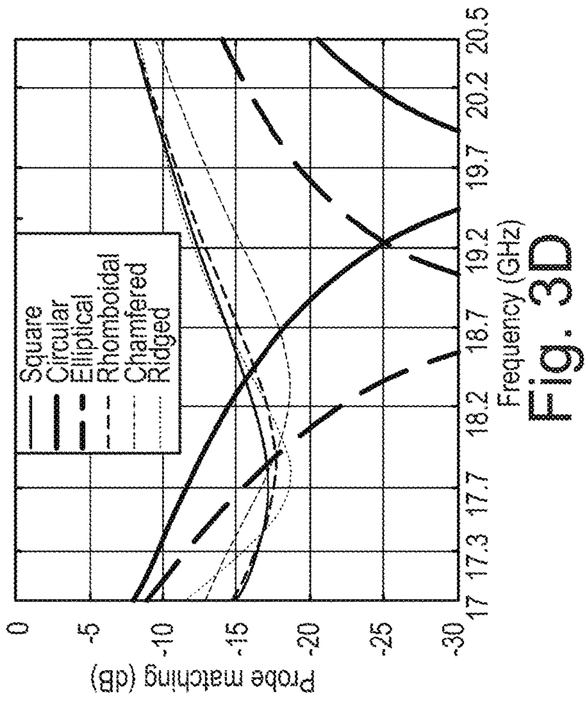

First, the operation of the OMT alone was assessed. The corresponding FEM model of the OMT 300 is illustrated in FIG. 3A. The OMT 300 includes a common waveguide with a first portion 10 and a second portion 20. Coupling probes 40, 45 are arranged in the second portion 20. The second portion 20 has an asymmetric cross-section, as described above. Various cross-sectional shapes were compared and proved to have very similar RF performance. The numerical results are reported in FIGS. 3B to 3D, which also show the reference two-probe design without compensation for comparison, in order to highlight the improvement achieved with the proposed design. Of these, FIG. 3B shows the axial ratio, FIG. 3C shows the probe coupling, and FIG. 3D shows the probe matching. The axial ratio is computed assuming that the two probes are fed by an ideal hybrid coupler. The results obtained for the axial ratio demonstrate that the proposed design can provide perfect cross-polarization cancellation for a given frequency, here selected as the center frequency over the Ka-band downlink. These results moreover confirm that the proposed design is generic with regard to the cross-sectional shape of the asymmetric portion of the common waveguide, and that the cross-sectional shape may be adjusted to match the cross-section of the other components connected to the OMT (e.g., horn antenna, septum polarizer, etc.). As to probe coupling and probe matching, it is noted that no particular effort was put in matching the various ports of the OMT. The purpose of showing these results is mainly to indicate that the proposed design does not significantly affect the probe coupling and probe matching when compared to reference designs. It is then anticipated that good matching can be achieved by implementing well-known matching techniques. It is also noted from FIG. 3C that probe coupling becomes less frequency dependent, as the values obtained are quite stable over the analyzed frequency range. This is expected to facilitate probe-to-probe coupling cancellation over a wide operating range if specified for a given application.

Figure 4A:
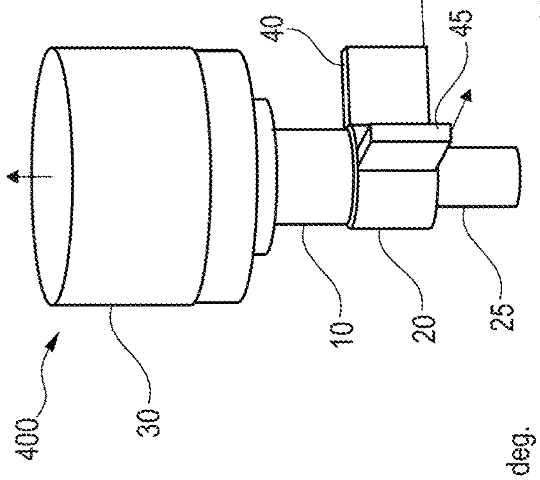
FIG. 4B and FIG. 4C are diagrams illustrating an RF performance of the waveguide component of FIG. 4A for dual-circular operation.
Figure 4B:
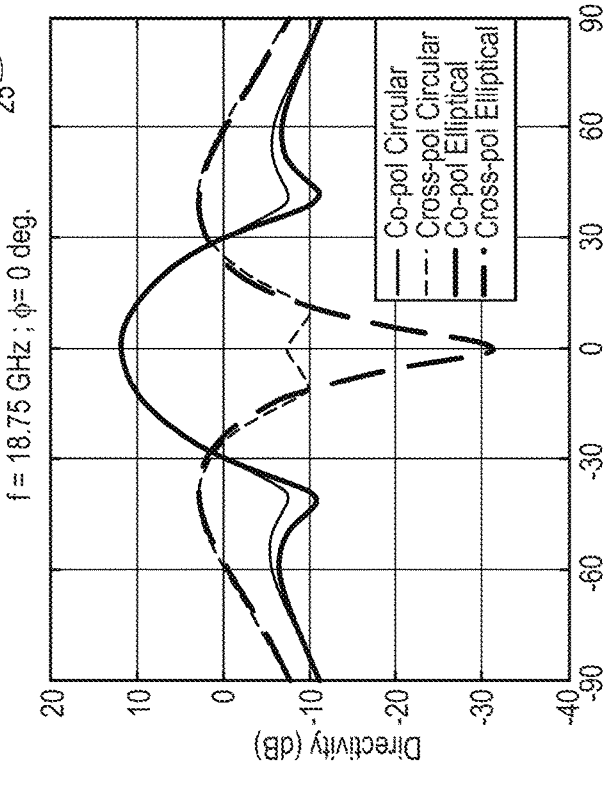
Figure 4C:
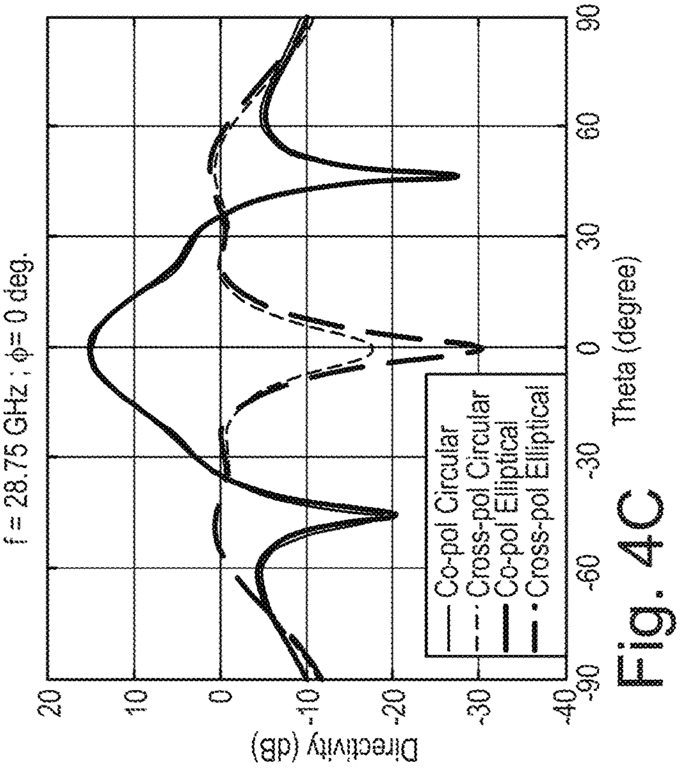
Figure 5A:
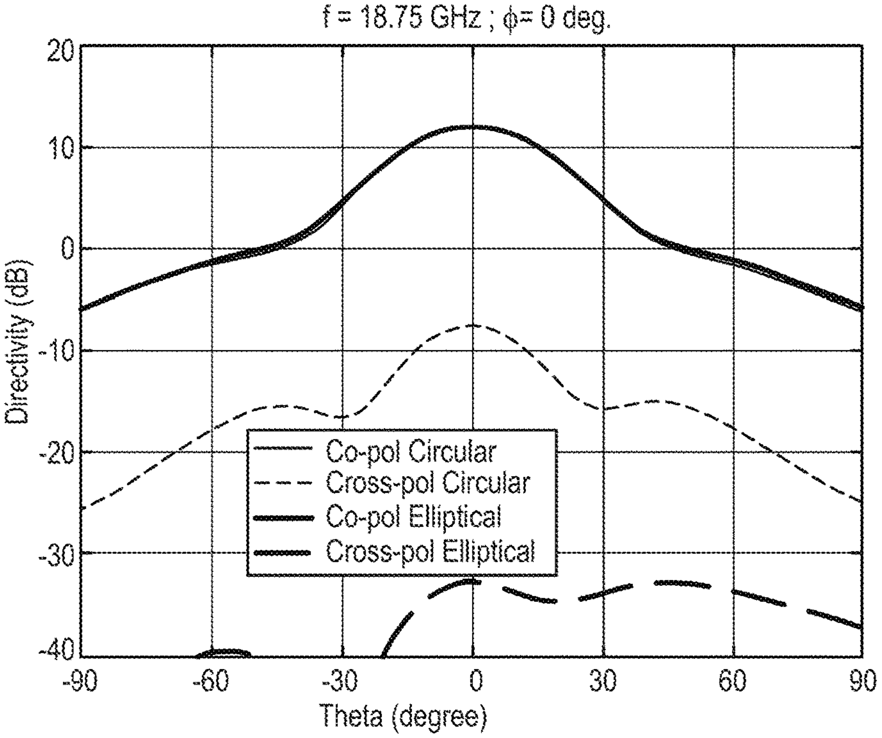
FIG. 5A and FIG. 5B are diagrams illustrating an RF performance of the waveguide component of FIG. 4A for dual-linear operation.
Figure 5B:
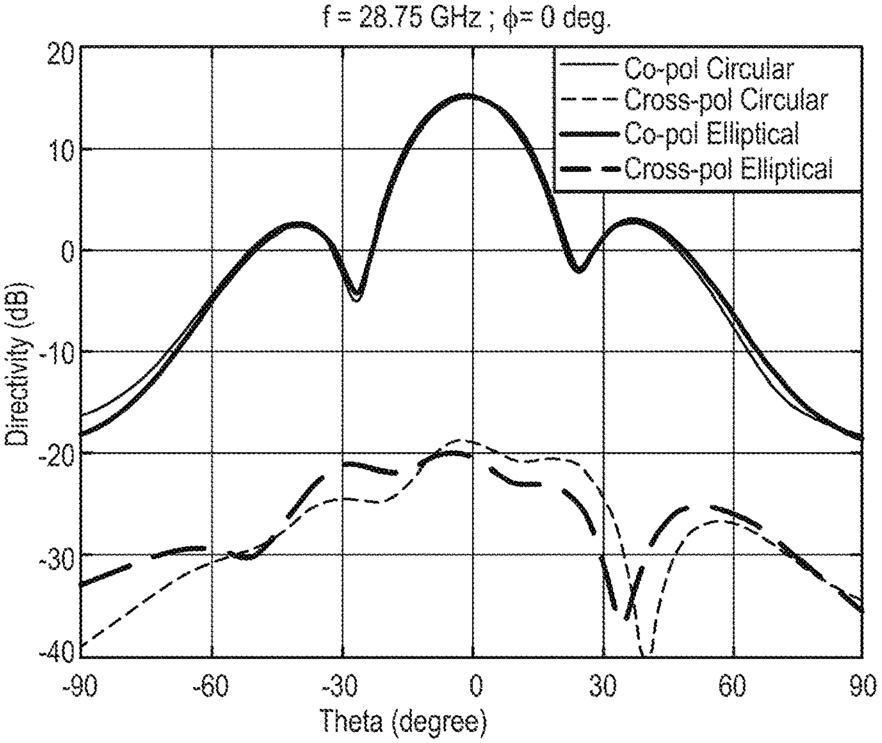

As a second step, operation of the proposed waveguide component when used as an OMJ was assessed. The main point of interest in this case is the impact of the proposed modification to the common waveguide on the higher frequency band performance. An OMJ using the proposed design was combined with a compact horn antenna (30 mm aperture diameter) to assess the performance directly in radiation. The corresponding FEM model of the OMJ 400 is illustrated in FIG. 4A, in which the common waveguide (comprising first and second portions 10, 20) is coupled to a compact horn 30. The common waveguide has a third portion 25, with a reduced cross-section that operates as a filter (below cut-off frequency) for the frequency of the electric field coupled by the two probes 40, 45. FIG. 4B and FIG. 4C illustrate radiation patterns for dual-circular operation, at frequencies of f=18.75 GHz and f=28.75 GHz, respectively, which correspond to the center frequencies of the two operating bands. The lower frequency corresponds to the electric field coupled by the two probes and radiated by the horn, while the higher frequency corresponds to the electric field captured by the horn and directed to the third portion 25 of the common waveguide. The two frequencies correspond respectively to the center frequencies of the down-link and up-link frequency bands allocated in K/Ka band for broadband satellite services. FIG. 5A and FIG. 5B illustrate radiation patterns for dual-linear operation, at frequencies of f=18.75 GHz and f=28.75 GHz, respectively. The on-axis cross-polarization improvement (which is mostly due to the OMJ rather than the horn itself due to symmetry considerations) is clearly visible in both linear and circular polarization operation modes (about 20 dB improvement in XPD). In the case of circular polarization, an ideal hybrid coupler is considered for the analysis. Interestingly, no degradation of performance is observed in the higher frequency band. The XPD performance is either unchanged (linear case) or slightly improved (circular case). The impact on the S-parameters is very similar to what was observed in the case of the single band OMT. These results confirm the high potential of the proposed waveguide component for the design of compact dual-polarization and dual-band feed chains on board of communication satellites.

Figure 6:
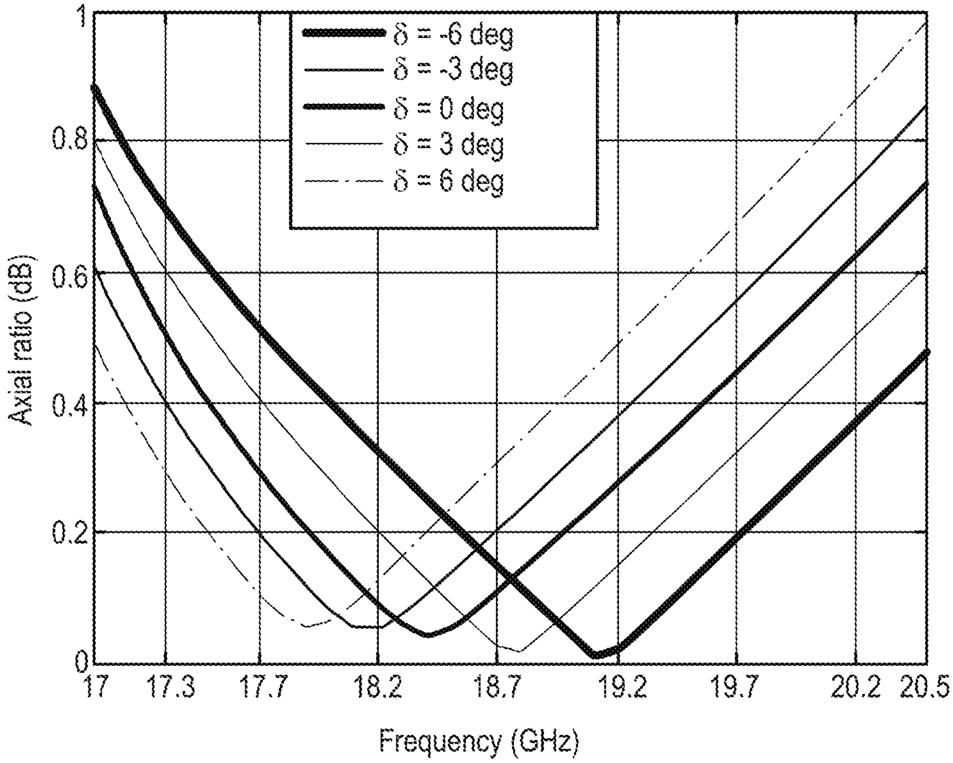
FIG. 6 is a diagram illustrating the impact of the angle parameter δ on the axial ratio, FIG. 7A schematically illustrates another example of a waveguide component according to embodiments of the disclosure.

One interesting parameter is the angle between the reference axes defined by the probes and the symmetry axes of the cross-section of the (asymmetric) second portion of the common waveguide. As mentioned earlier, the nominal case corresponds to an angle of 45 degrees. This provides equivalent operation for the two ports, hence similar performance for the two orthogonal polarizations, both in dual-linear and dual-circular operation. For some applications (e.g., single-feed-per-beam antenna configuration), there may be some interest in optimizing the performance over a sub-frequency band for frequency reuse. When modifying the angle between the reference axes by adjusting the angle δ, as shown in FIG. 1, one can tune the center of the axial ratio bandwidth. Due to symmetry considerations, increasing the optimal axial ratio frequency for one port will lower it for the other port. Hence, one can find an optimum with orthogonal polarization over the two sub-frequency bands by tuning the angle δ. FIG. 6 shows the impact of the angle parameter δ on the axial ratio.

Figure 7A:
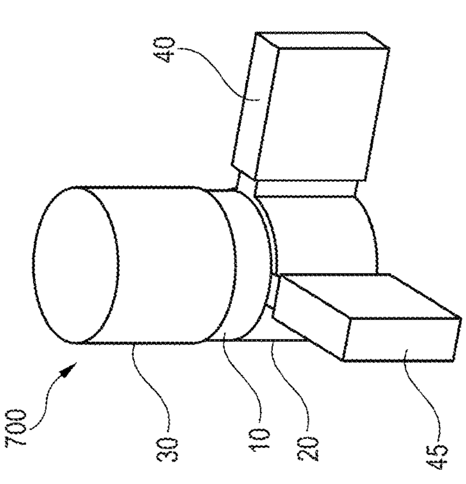
FIG. 7B to FIG. 7D are diagrams illustrating an RF performance of the waveguide component of FIG. 7A, FIG. 8 schematically illustrates definitions and nomenclature for a generic waveguide component according to embodiments of the disclosure.
Figure 7B:
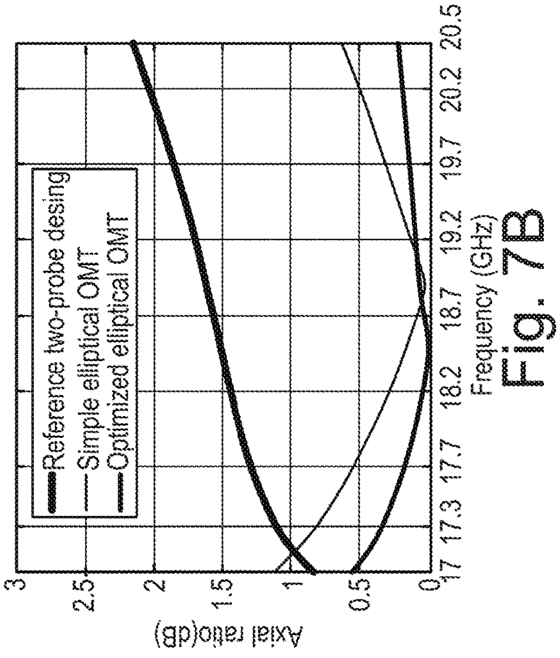
Figure 7C:
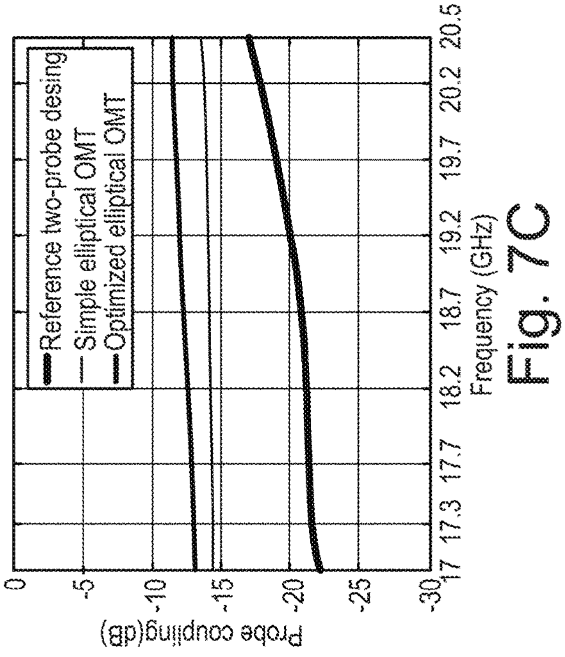
Figure 7D:
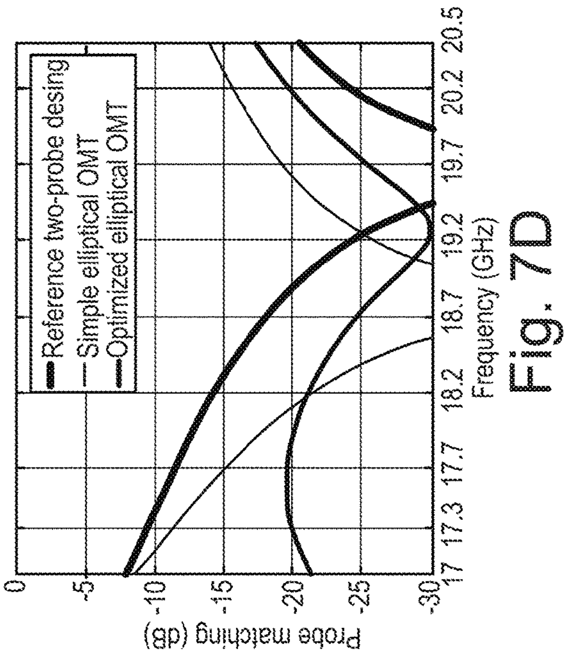

Further, the RF performance of the proposed waveguide component when used as an optimized OMT including conventional matching sections was assessed. The corresponding FEM model of the OMT 700 is illustrated in FIG. 7A. In this example, the (asymmetric) second portion of the common waveguide has elliptical cross-sectional shape. FIG. 7B shows the axial ratio for the OMT, FIG. 7C shows the probe coupling, and FIG. 7D shows the probe matching.

Figure 8:
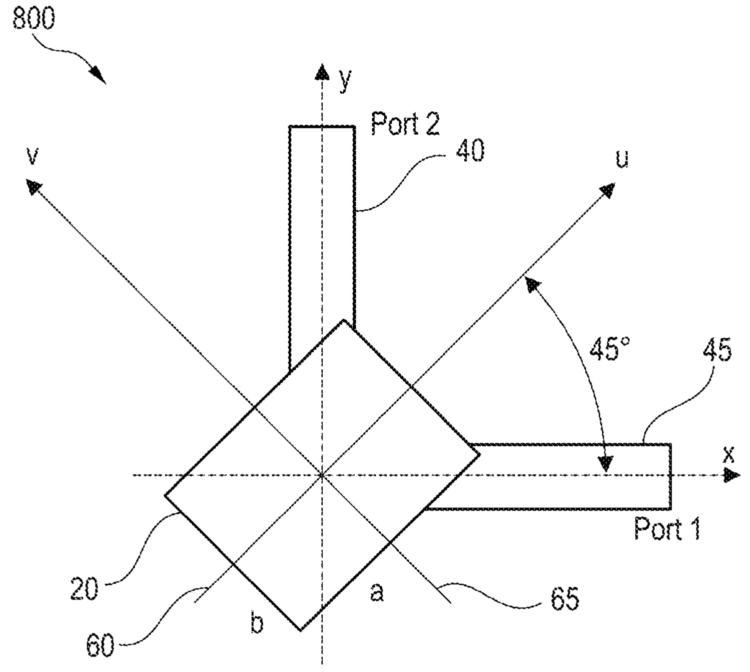

While the FEM models provide some quantification of the achievable RF properties with the proposed component, they provide limited insight. A specific example is described to highlight key features of the proposed component. The cross-section used in this example is not optimal as it will be evident that it provides lower RF performance when compared to the cross-sections discussed above but it facilitates the description of the operating principle. This example assumes, for the second portion 20 of the common waveguide, a rectangular waveguide with its axes (u, v) rotated 45 degrees with respect to the axes (x, y) of the probes. An example of such rectangular waveguide 800 is schematically illustrated in FIG. 8.

The dimensions of the waveguide cross-section in the OMT area are a and b along u and v axes, respectively. The OMT is connected to a square waveguide with a cross-section side dimension set to a. The common waveguide port is labelled as port 3 (see, e.g., FIG. 9A), while port 1 and port 2 correspond to the vertical and horizontal polarization ports, respectively.

This configuration enables to analytically define the modes in the common waveguide section. The main interest is on the TE modes (Transverse Electric modes, i.e. modes with a longitudinal field component equal to 0). The transverse electric field of the $TE_{mn}$ modes can be expressed analytically by its components in (u, v) as follows $$\begin{cases} E_u \sim \cos\left(\frac{m\pi u}{a}\right)\sin\left(\frac{n\pi v}{b}\right)e^{-jk_z z} \\ E_v \sim \sin\left(\frac{m\pi u}{a}\right)\cos\left(\frac{n\pi v}{b}\right)e^{-jk_z z} \end{cases} \quad (1)$$

where m and n are integers defining possible modes and corresponding to the number of half cycle variations of the field in the u and v directions respectively, and $k_z$ is the wave number along the direction of propagation in the common waveguide (e.g., the z-axis in the present example).

The wave number may be defined as $$k_z=\sqrt{k^2-k_c^2}$$

where $$k = \frac{2\pi f}{c} = \frac{2\pi}{\lambda}$$

is the wave number in free space, which may be expressed as a function of the frequency f and the speed of light c or as a function of the wavelength λ, and $k_c$ is the cut-off wave number, which may be expressed as $$k_c = \sqrt{\left(\frac{m\pi}{a}\right)^2 + \left(\frac{n\pi}{b}\right)^2} \quad (3)$$

The operation of the proposed waveguide component relies on the two fundamental modes of the common waveguide, the $TE_{10}$ and $TE_{01}$ modes. Their respective wave numbers may be expressed as $$\begin{cases} k_{z10} = \sqrt{k^2 - \left(\frac{\pi}{a}\right)^2} \\ k_{z01} = \sqrt{k^2 - \left(\frac{\pi}{b}\right)^2} \end{cases} \quad (4)$$

Using equation (1), the electric fields of the two fundamental modes may be expressed as $$\begin{cases} \vec{E}_{10} \sim \sin\left(\frac{\pi u}{a}\right)e^{-jk_{z10}z}\vec{v} \\ \vec{E}_{01} \sim \sin\left(\frac{\pi v}{b}\right)e^{-jk_{z01}z}\vec{u} \end{cases} \quad (5)$$

Adjusting the aspect ratio e=a/b of the rectangular waveguide section, its location with respect to the probes, and/or its longitudinal length, one can effectively tune the amplitude and phase difference between the two fundamental modes.

For the part of the rectangular waveguide section outside of the probing area, equation (5) indicates that an aspect ratio e>1 will introduce a phase delay in the v-polarized field component when compared to the u-polarized field component as $k_{z10}>k_{z01}$.

Figure 9A:
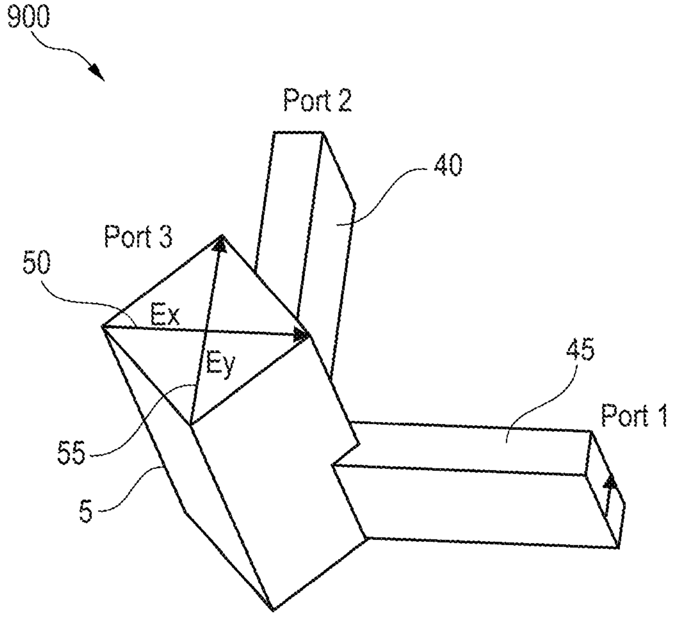
FIG. 9A illustrates an example of a reference waveguide component.
Figure 9B:
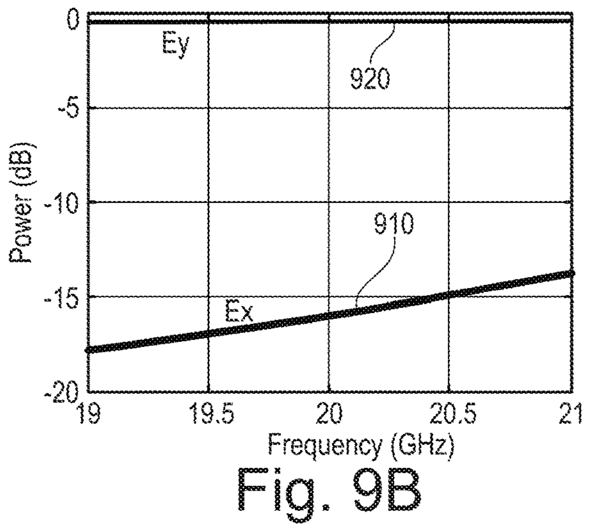
FIG. 9B and FIG. 9C are diagrams illustrating an RF performance of the waveguide component of FIG. 9A.
Figure 9C:
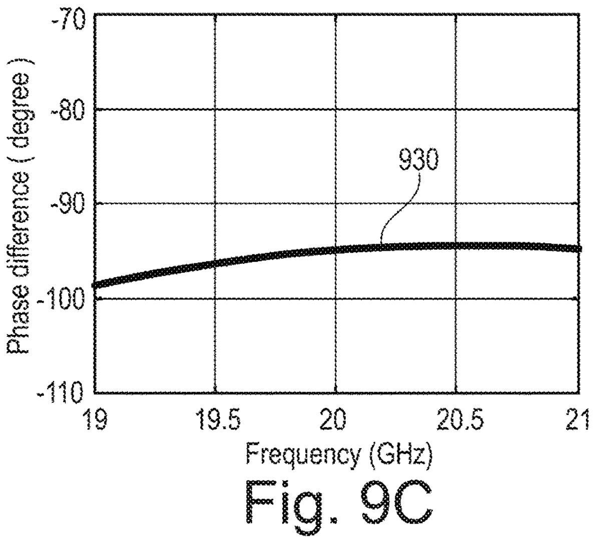
Figure 9D:
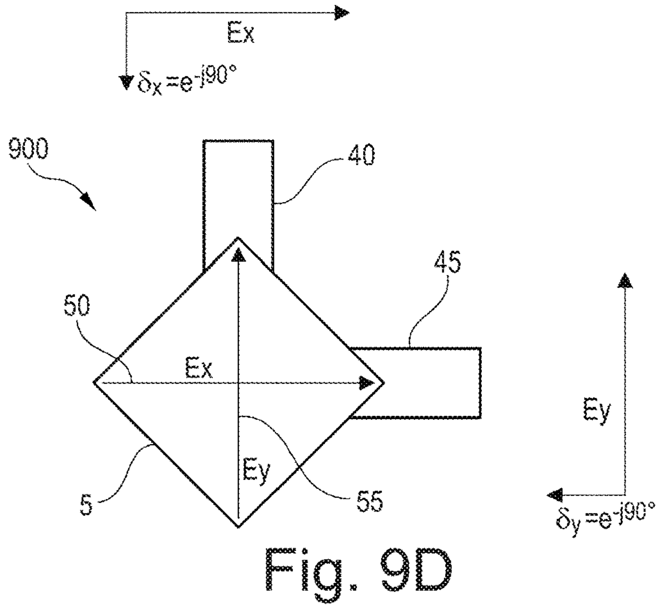
FIG. 9D illustrates undesired field components in the waveguide component of FIG. 9A, FIG. 10A schematically illustrates another example of a waveguide component according to embodiments of the disclosure.

Ideally, one would like to get a vertically polarized (y-axis), respectively horizontally polarized (x-axis), electric field when exciting port 1, respectively port 2. But the reference two-probe OMT with a symmetric common waveguide cross-section (e.g., square cross-section in the present example), introduces a level of cross-polarization due to the asymmetry in the waveguide probing. This is illustrated in FIGS. 9A to 9C, based on an analysis of a simple model including only the OMT part. FIG. 9A schematically illustrates the OMT part 900 that is used for the analysis, showing also the x-polarized field component $E_x$ 50 and the y-polarized field component $E_y$ 55 within the common waveguide 5. FIG. 9B illustrates the power level 910 of the x-polarized field component and the power level 920 of the y-polarized field component obtained when feeding at port 1 for a design tuned to operate around 20 GHz. FIG. 9C illustrates the phase difference 930 between the x-polarized and y-polarized field components. As can be seen from these diagrams, the undesired field component is about 15 dB below the desired field component at the design frequency, with a phase delay of about 90 degrees. For comparison, a similar reference OMT with a circular common waveguide has an undesired field component around 18 dB below the desired field component. The undesired field components are schematically illustrated in FIG. 9D, which shows the electric field components in the two-probe OMT 900.

One can express the electric fields obtained when feeding port 1 and port 2 as follows $$\begin{cases} \vec{E}_1 \sim E_y\vec{y} - j\delta_x\vec{x} \\ \vec{E}_2 \sim E_x\vec{x} - j\delta_y\vec{y} \end{cases} \quad (6)$$

where $E_x$, $E_y$ are the desired field components and $\delta_x$, $\delta_y$ are the undesired field components.

The corresponding electric fields have an elliptical polarization with the major axis of the ellipse being approximately aligned with the desired field component.

Introducing the (u, v) coordinate system with the following equations $$\begin{cases} \vec{x} = \vec{u} - \vec{v} \\ \vec{y} = \vec{u} + \vec{v} \end{cases} \tag{7}$$

one can express the electric fields as $$\begin{cases} \vec{E}_1 \sim (E_y - j\delta_x)\vec{u} + (E_y + j\delta_x)\vec{v} \\ \vec{E}_2 \sim (E_x - j\delta_y)\vec{u} - (E_x + j\delta_x)\vec{v} \end{cases} \tag{8}$$

Using now the phase delay <p>0 introduced in the v-polarized field component by the proposed OMT concept, the following field expressions are obtained at port 3 when exciting port 1 and port 2

$$\begin{cases} \vec{E}_1 \sim (E_y - j\delta_x)\vec{u} + (E_y + j\delta_x)e^{-j\phi}\vec{v} \\ \vec{E}_2 \sim (E_x - j\delta_y)\vec{u} - (E_x + j\delta_x)e^{-j\phi}\vec{v} \end{cases} \tag{9}$$

Bringing back this field decompositions in the (x, y) coordinate system, the following expressions are obtained $$\begin{cases} \vec{E}_1 \sim \left(E_y\left(1 - e^{-j\phi}\right) - j\delta_x\left(1 + e^{-j\phi}\right)\right)\vec{x} + \left(E_y\left(1 + e^{-j\phi}\right) - j\delta_x\left(1 - e^{-j\phi}\right)\right)\vec{y} \\ \vec{E}_2 \sim \left(E_x\left(1 + e^{-j\phi}\right) - j\delta_y\left(1 - e^{-j\phi}\right)\right)\vec{x} + \left(E_x\left(1 - e^{-j\phi}\right) - j\delta_y\left(1 + e^{-j\phi}\right)\right)\vec{y} \end{cases} \tag{10}$$

Hence, the electric fields at port 3 will be linearly polarized if the following conditions are met $$\begin{cases} E_y\left(1 - e^{-j\phi}\right) - j\delta_x\left(1 + e^{-j\phi}\right) = 0 \\ E_x\left(1 - e^{-j\phi}\right) - j\delta_y\left(1 + e^{-j\phi}\right) = 0 \end{cases} \tag{11}$$

This leads to the following condition $$\tan\left(\frac{\phi}{2}\right) = \frac{\delta_x}{2E_y} = \frac{\delta_y}{2E_x} \tag{12}$$

Due to the OMT symmetry along the u-axis, the ratios $$\frac{\delta_x}{E_y}$$

and are $$\frac{\delta_y}{E_x}$$

equal, hence the condition (12) can be met simultaneously for the two ports. Interestingly, those ratios are also small as $E_x$ »$\delta_y$ and $E_y$»$\delta_x$ for most waveguide cross-sections of interest. Consequently, a small phase delay is required to correct for the cross-polarization introduced by the two-probe OMT, enabling to keep the design very compact. For OMT designs with no symmetry along the u-axis, for example when introducing the angle δ for further optimization, the condition (12) can be met for the two ports but at different frequencies, as evidenced with the results reported in FIG. 6.

In the case of the rectangular waveguide, the phase delay may be expressed as follows $$\phi = d(k_{z10} - k_{z01}) \tag{13}$$

where d is the longitudinal length of the asymmetric portion of the common waveguide. Using the approximation tan α~α for small angles, one can write the following condition in the case of the rectangular waveguide $$d\left(\sqrt{k^2 - \left(\frac{\pi}{a}\right)^2} - \sqrt{k^2 - \left(\frac{\pi}{b}\right)^2}\right) \sim \frac{\delta}{E} \tag{14}$$

From this equation, one can see that it is possible to find a good trade-off between the aspect ratio and the longitudinal length of the asymmetric waveguide section required to achieve the desired cross-polarization cancellation. It is also important to note that equation (14) is frequency-dependent, as the free-space wave number k is present in this equality. In general, the ratio of the undesired electric field to the desired electric field, $$\frac{\delta}{E},$$

is also frequency dependent as demonstrated in FIG. 9B. As a consequence, the condition can only be met at a given frequency. The trade-off between the aspect ratio and the longitudinal length of the asymmetric portion of the common waveguide may take this also into account for applications requiring a large fractional bandwidth. The dispersive behavior of the waveguide component can be minimized by using aspect ratio values closer to 1, thus resulting in slightly longer OMT designs.

More generally, any cross-section shape enabling to introduce a phase delay in the v-polarized field component when compared to the u-polarized field component can provide the same cross-polarization correction effect. In this case, a numerical electromagnetic solver may be used to optimize the cross-section shape.

Once the linearly polarized fields are corrected, one can generate circularly polarized fields by simultaneously feeding port 1 and port 2 with the same amplitude and a phase shift of ±90° to achieve left-hand and right-hand circularly polarized electric fields.

Another interesting finding that comes from that analysis is the following. Because the phase delay introduced by the asymmetric waveguide section is rather small, one can use that component as an OMJ without significantly affecting the frequency band that is not extracted or excited by the probes, thus enabling the use of this component in dual- and multi-band feed systems. If required, one could also adjust the OMT(s) and/or OMJ(s) at those other frequencies to account for the small phase delay introduced by the asymmetric portion of the common waveguide and to further improve the performance at those frequencies.

Simulation results for the considered cross-section obtained with a FEM model are described next.

Figure 10A:
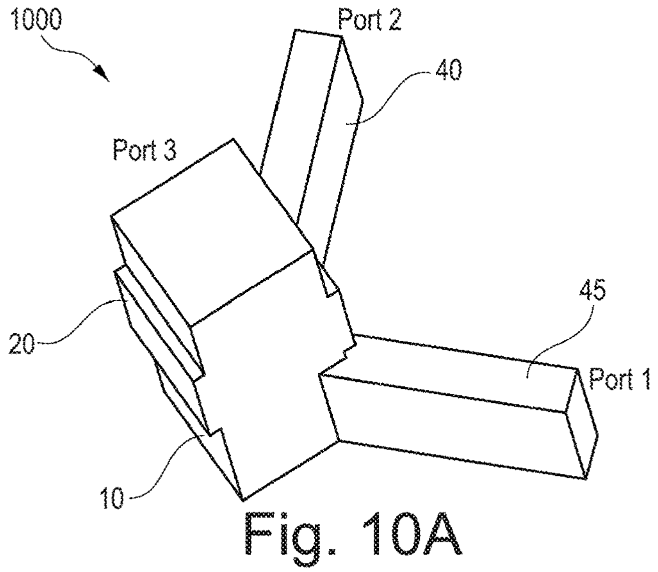
FIG. 10B to FIG. 10D are diagrams illustrating an RF performance of the waveguide component of FIG. 10A, FIG. 11A schematically illustrates another example of a waveguide component according to embodiments of the disclosure.

FIG. 10A shows an example of a waveguide component 1000 in which the coupling probes 40, 45 are arranged in the first portion 10 of the common waveguide, and thus removed from the (asymmetric) second portion 20.

Figure 10B:
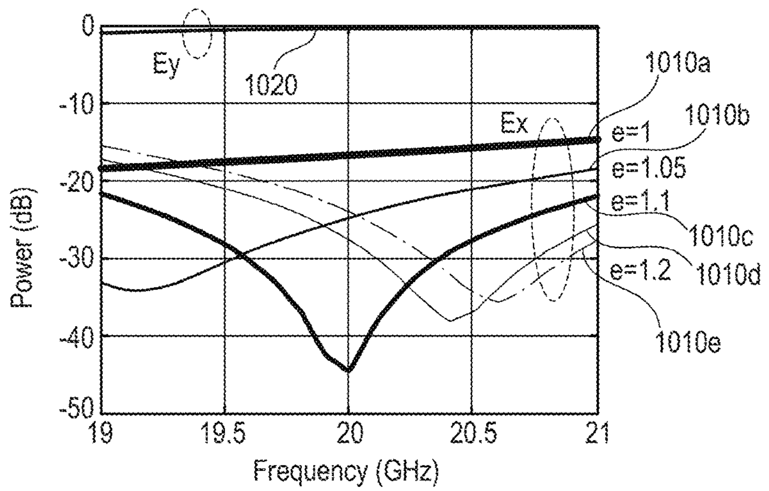

For the analysis of this waveguide component 1000, we fix the longitudinal length d and vary the aspect ratio e of the asymmetric waveguide section located just above the probing section to identify when the condition (14) is met. A similar study could be done fixing e and varying d. The simulation results shown in FIG. 10B illustrate the impact of the aspect ratio e on the linearly polarized components when feeding port 1. Therein, graph 1010*a* relates to the *x*-polarized field component for aspect ratio e=1. Graphs 1010*b*, 1010*c*, 1010*d*, and 1010*e* relate to aspect ratios e=1.05, e=1.1, e=1.15, and e=1.2, respectively. Graph 1020 relates to the y-polarized field component. Effectively, the y-polarized field component for all aspect ratio values listed above are reported in FIG. 10B, but the variations are not visible with the selected ordinate scale and all graphs are superimposed with Graph 1020. As can be seen, the aspect ratio value e=1.1 provides the lowest undesired field component power level at 20 GHz.

Figure 10C:
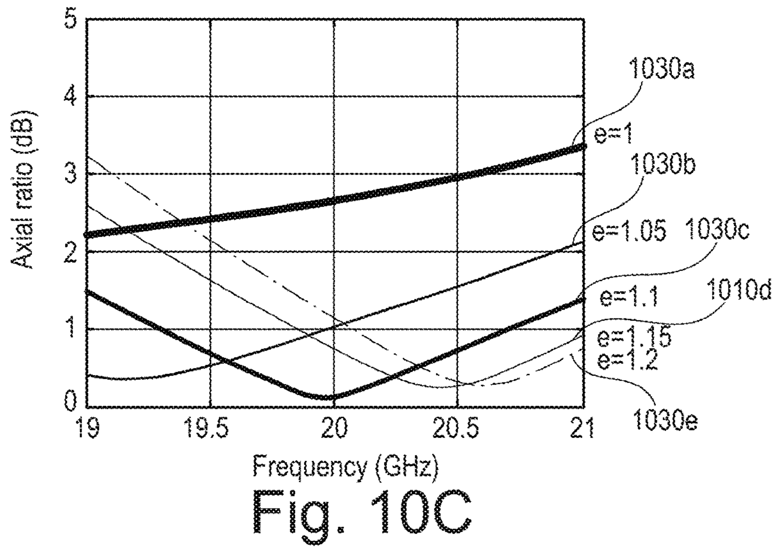

FIG. 10C shows simulation results for the axial ratio of a circularly polarized electric field, assuming port 1 and port 2 are simultaneously fed with the same amplitude and a phase shift of 90°. Graphs 1030*a*, 1030*b*, 1030*c*, 1030*d*, and 1030*e* relate to aspect ratios e=1, e=1.05, e=1.1, e=1.15, and e=1.2, respectively. As can be seen, the aspect ratio value e=1.1 provides the required adjustment at 20 GHz. Due to the symmetry of the OMT along the u-axis, the two probes will provide the same performance, but with inverted handedness of circular polarization when fed by a hybrid coupler.

Figure 10D:
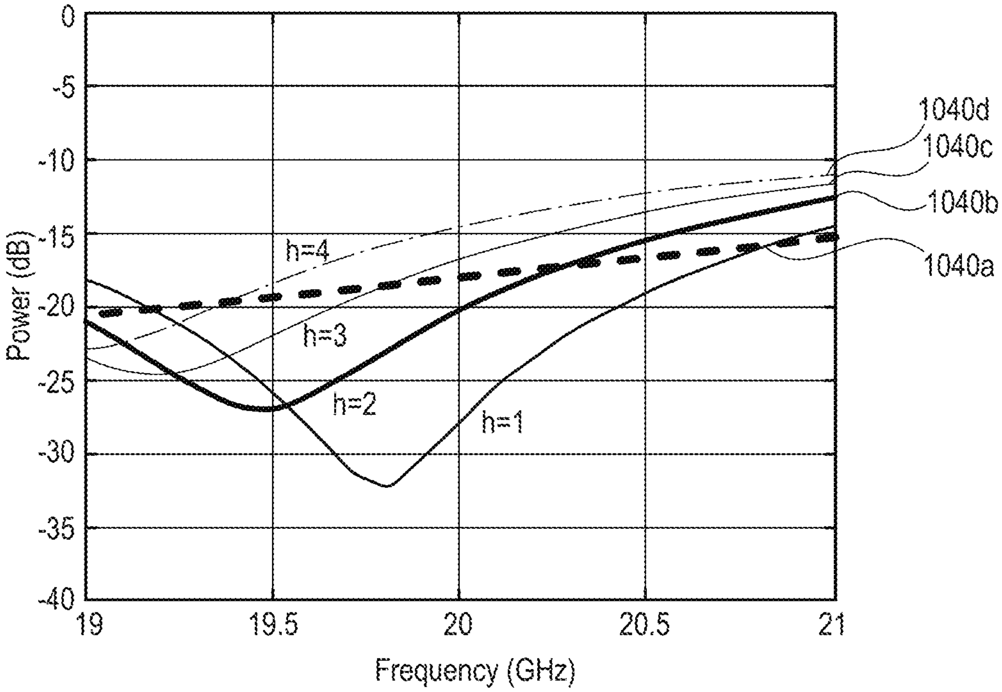

While the return loss at the probes is not affected by the asymmetric waveguide section, the probe-to-probe coupling can vary quite significantly and is mostly driven by the distance between the probing section (i.e., that portion of the common waveguide in which the coupling probes are arranged) and the asymmetric waveguide section (i.e., the second portion). FIG. 10D illustrates how probe-to-probe coupling varies with the distance h between the asymmetric section and the probing section for an aspect ratio e=1.1, corresponding to the optimal value of the aspect ratio identified above. Graphs 1040*a*, 1040*b*, 10400*c*, and 1040*d* relate to distances h=1, h=2, h=3, and h=4, respectively, where the distances h are expressed in millimeters. As can be seen from that diagram, probe-to-probe coupling can be improved when compared to conventional symmetric OMT performance (dashed curve). On the other hand, the distance h is found to have a rather limited impact on the cross-polarization discrimination, thus enabling a simultaneous improvement of the probe-to-probe coupling and of the XPD.

Figure 11A:
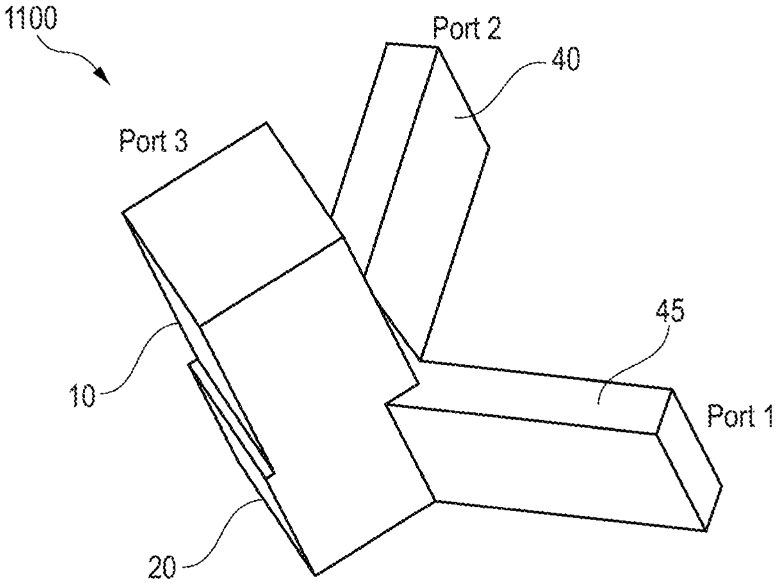
FIG. 11B to FIG. 11D are diagrams illustrating an RF performance of the waveguide component of FIG. 11A, FIG. 12A and FIG. 12B respectively illustrate a reference OMT with an unbalanced coupler and an OMT with an unbalanced coupler according to embodiments of the disclosure.

In the case where the asymmetric section coincides with the probing section (i.e., where the coupling probes are arranged in the second portion of the waveguide), the operation is slightly modified. FIG. 11A shows an example of such waveguide component 1100 in which the coupling probes 40, 45 are arranged in the (asymmetric) second portion 20 of the common waveguide. This configuration may be of interest for designs requiring to reduce the total length of the feed chain, for example.

Figure 11B:
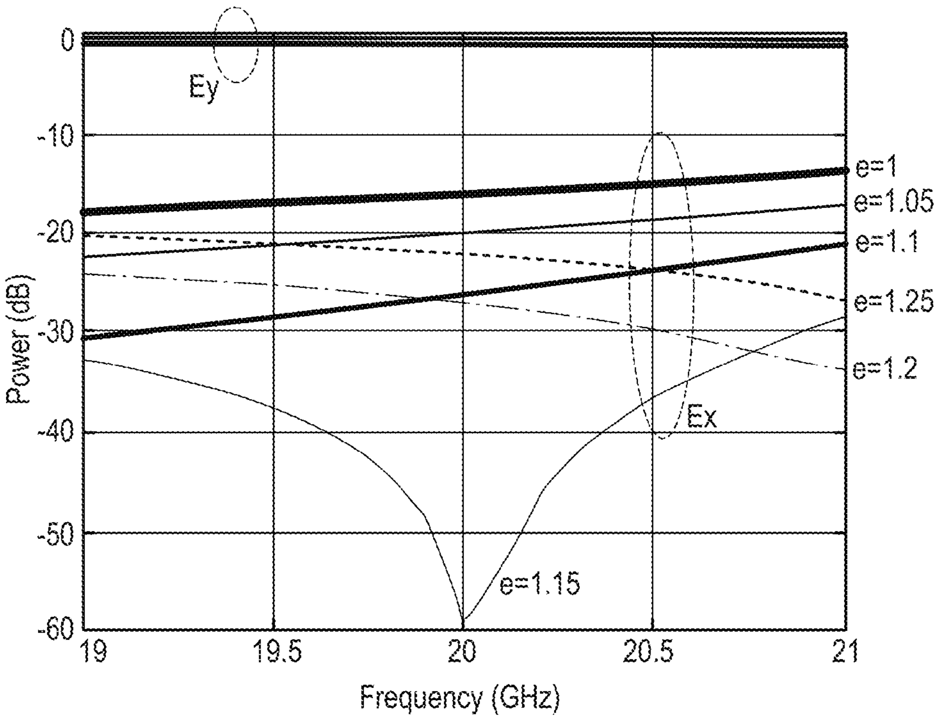
Figure 11C:
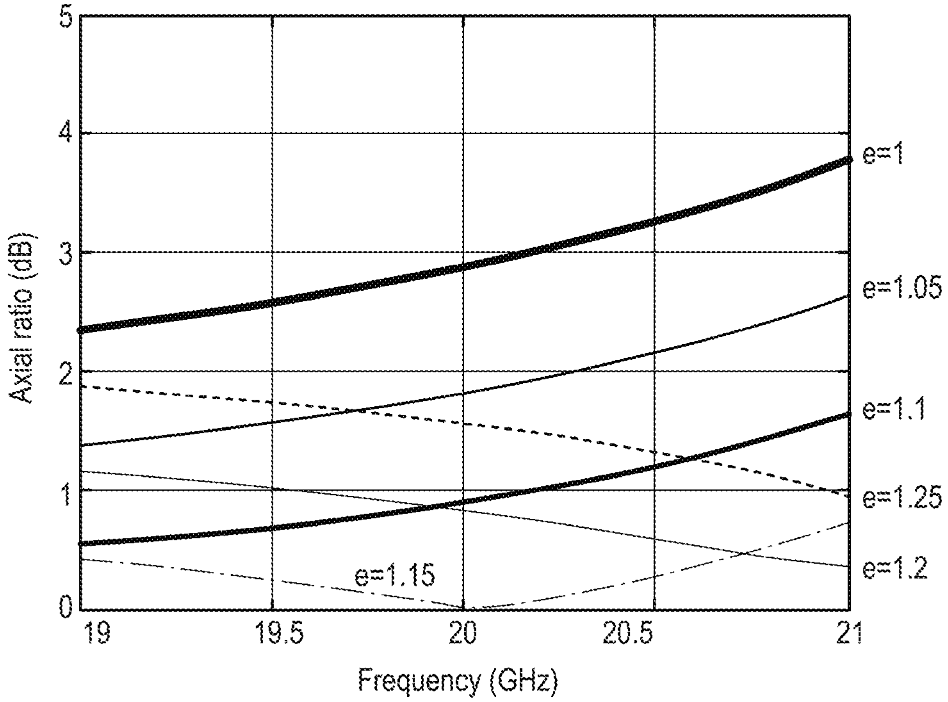
Figure 11D:
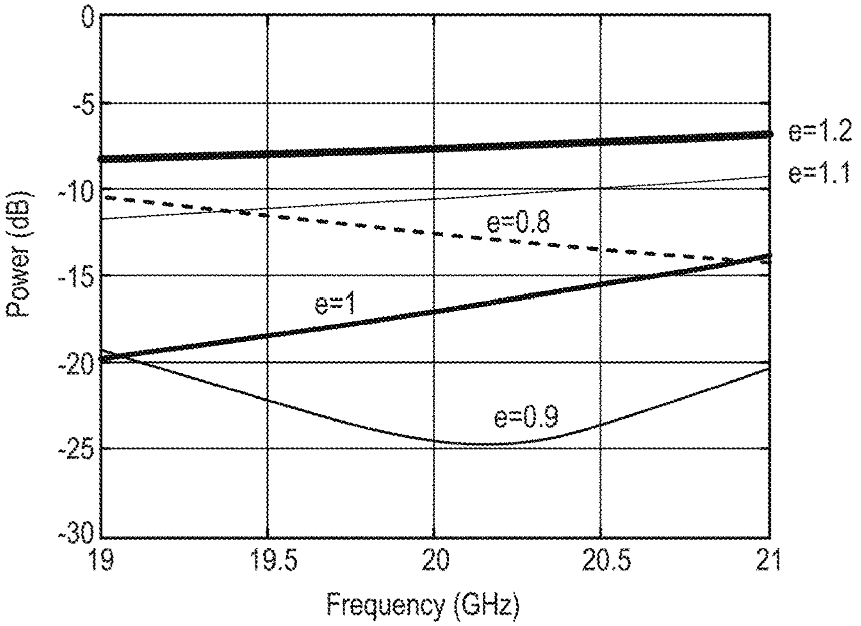

In this configuration, the asymmetric section is mostly adjusting the amplitude balance between the two fundamental modes with a direct impact on port-to-port coupling. Simulation results for the case of linear polarization operation (port 1 only) are shown in FIG. 11B, and simulation results for the case of circular polarization operation (port 1 and port 2 simultaneously with equal amplitude and 90 degrees phase shift) are shown in FIG. 11C (axial ratio) and FIG. 11D (port-to-port coupling). As can be seen from these diagrams, the port-to-port coupling degrades as the axial ratio improves. For applications requiring single-polarization operation, this may be acceptable and the unused port can be loaded. However, for applications requiring dual-polarization operation or circular polarization, port-to-port coupling may degrade the overall feed performance such as return loss at probe ports. Interestingly, it is noted that an aspect ratio e<1 can be used to reduce port-to-port coupling, but might result in increased cross-polarization level.

Figure 12B:
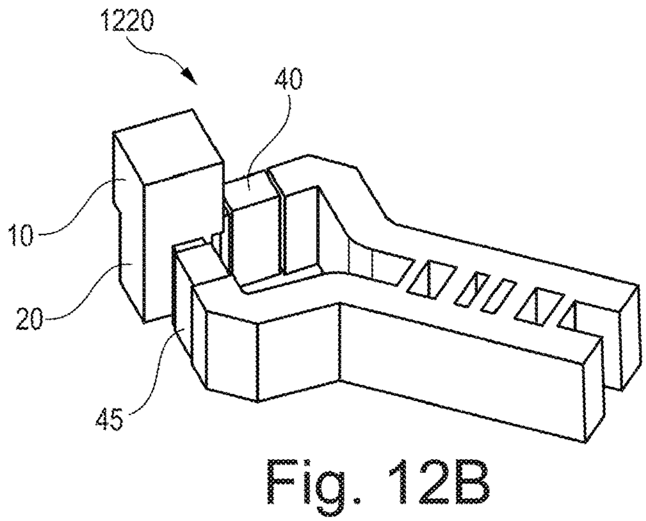
Figure 12C:
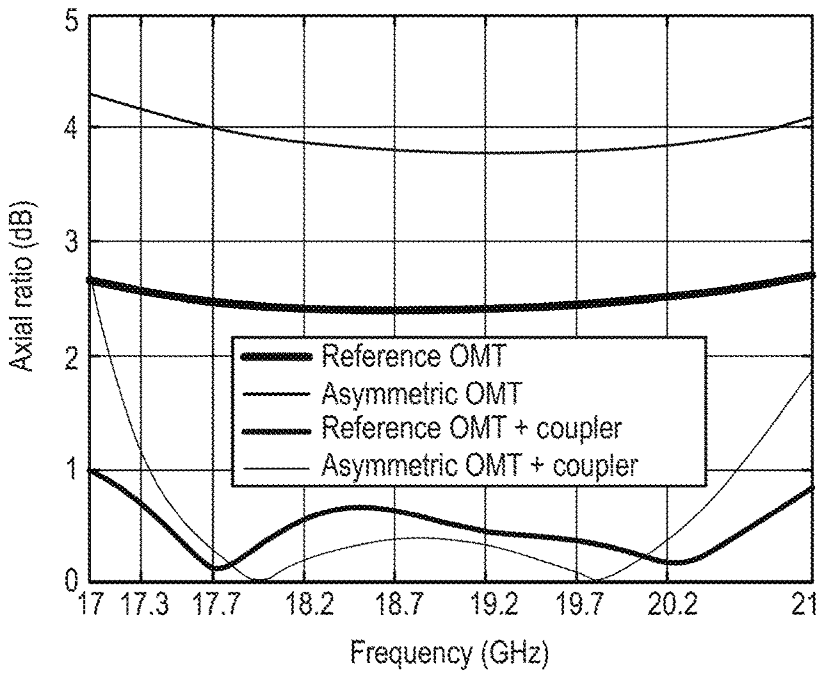
Figure 12D:
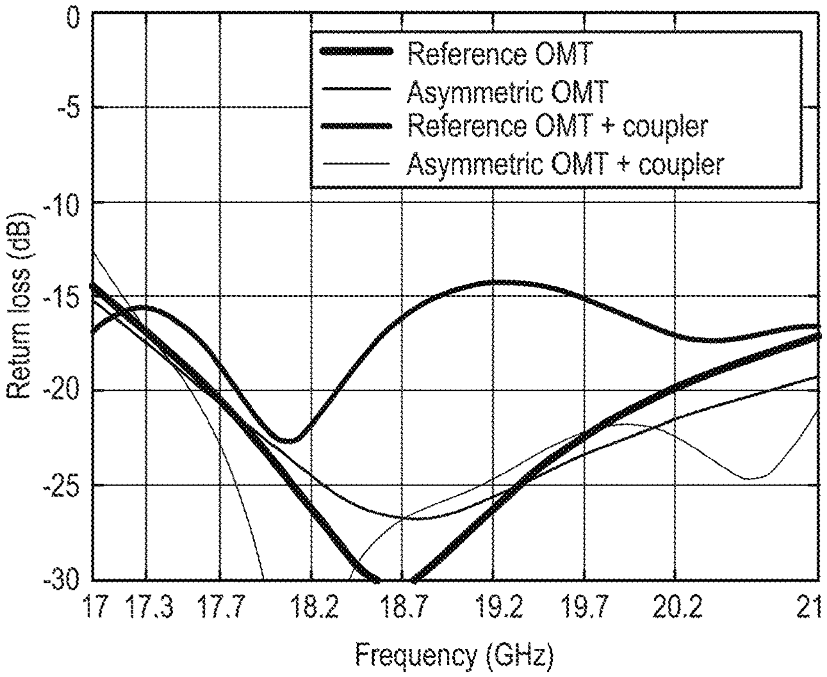
Figure 12E:
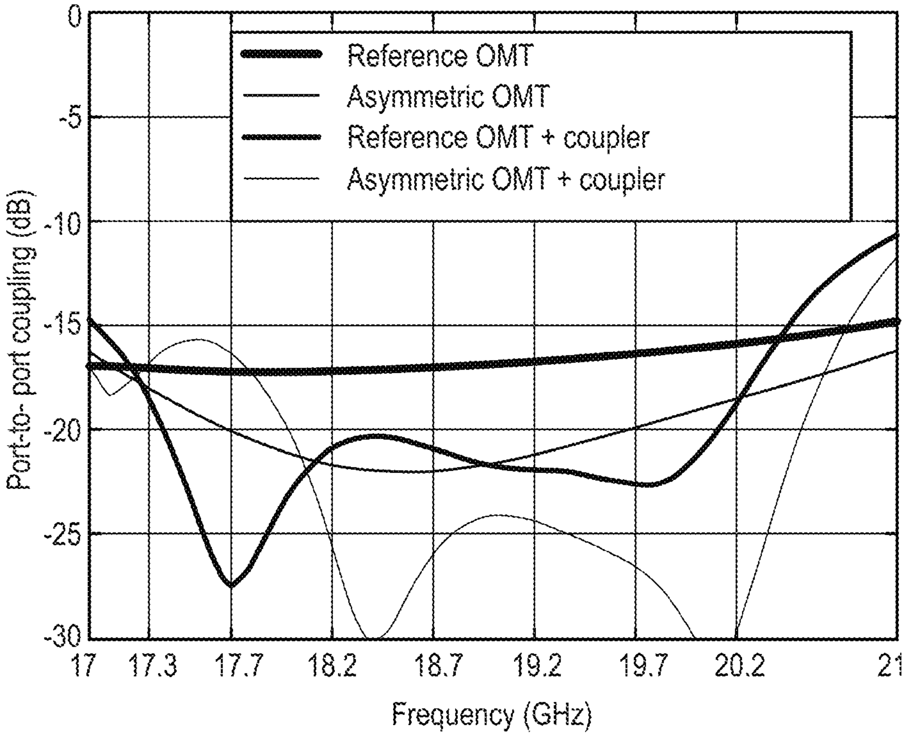

Based on the above, it is found that the asymmetric OMT design with improved probe-to-probe coupling may be combined with an unbalanced coupler to recover the cross-polarization discrimination performance and enhance the overall feed performance. A preliminary assessment of the proposed asymmetric OMT with an unbalanced coupler is described next. The frequency band analyzed corresponds to part of the K-band spectrum (17.3-20.2 GHz) allocated to broadband satellite services. FIG. 12A shows, as reference case, an OMT 1210 with a square common waveguide and an unbalanced coupler to recover the axial ratio degradation coming from the two-probe excitation. This configuration is compared to the asymmetric (chamfered) OMT 1220 shown in FIG. 12B combined with its respective optimized coupler. Simulation results, with and without the respective unbalanced couplers, relating to the axial ratio, return loss, and port-to-port coupling are respectively illustrated in FIG. 12C to FIG. 12E.

At OMT level, it is clear that the proposed asymmetric OMT improves the probe-to-probe coupling (around −20 dB instead of −16 dB), at the expense of a degraded axial ratio (around 4 dB instead of 2.5 dB), while return loss values are quite similar for the two solutions. The probe-to-probe coupling of the reference OMT leads to degraded return loss performance when combined with the coupler. This is because the combination of two directional couplers is equivalent to a 0 dB coupler or cross-over and the electric field coupling from probe to probe goes twice through the directional coupler. The proposed asymmetric OMT combined with the adequate unbalanced coupler has a return loss higher than 20 dB over a very wide frequency range, while the reference design provides a worst case performance in the range of 14 dB. Further improvement over the reference OMT could be achieved by refining the design and it is to be noted that the port-to-port coupling of the reference OMT will limit the achievable return loss when combined with a coupler.

For the same reason as above, the return loss at OMT level drives the port-to-port coupling of the OMT combined with the unbalanced coupler. Hence, both OMT solutions have good port-to-port coupling when combined with the adequate unbalanced coupler (better than −20 dB).

Interestingly, the asymmetric OMT does not change the phase shift between the desired field component ($E_{co}$) and the undesired field component ($E_{cx}$). Hence, one can rewrite equation (6) as follows $$\begin{cases} \vec{E}_1 \sim E_{co}\vec{y} - jE_{cx}\vec{x} \\ \vec{E}_2 \sim E_{co}\vec{x} - jE_{cx}\vec{y} \end{cases} \tag{15}$$

While for a conventional OMT, the values of $E_{cx}$ are typically in the range of −20 dB to −17 dB, it goes up to about −13 dB for the chamfered square OMT and could range between −15 and −10 dB for other asymmetric cross-section shapes.

For an analysis of the electric fields of the OMT design with the coupler, the following matrix representation is used for an ideal directional coupler, where the parameter θ enables to adjust the unbalance between output ports $$[S] = \begin{bmatrix} 0 & j\sin\theta & \cos\theta & 0 \\ j\sin\theta & 0 & 0 & \cos\theta \\ \cos\theta & 0 & 0 & j\sin\theta \\ 0 & \cos\theta & j\sin\theta & 0 \end{bmatrix} \quad (16)$$

The matrix representation assumes the following port definition:

Port 1 and port 4 are the input ports

Port 2 and port 3 are the output ports

Port 2 is the direct port for port 1 and the coupled port for port 4

Port 3 is the direct port for port 4 and the coupled port for port 1.

Figure 12F:
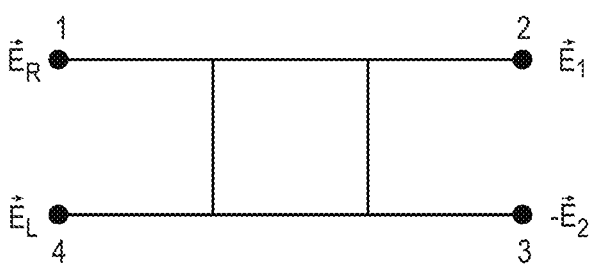
Figure 13B:
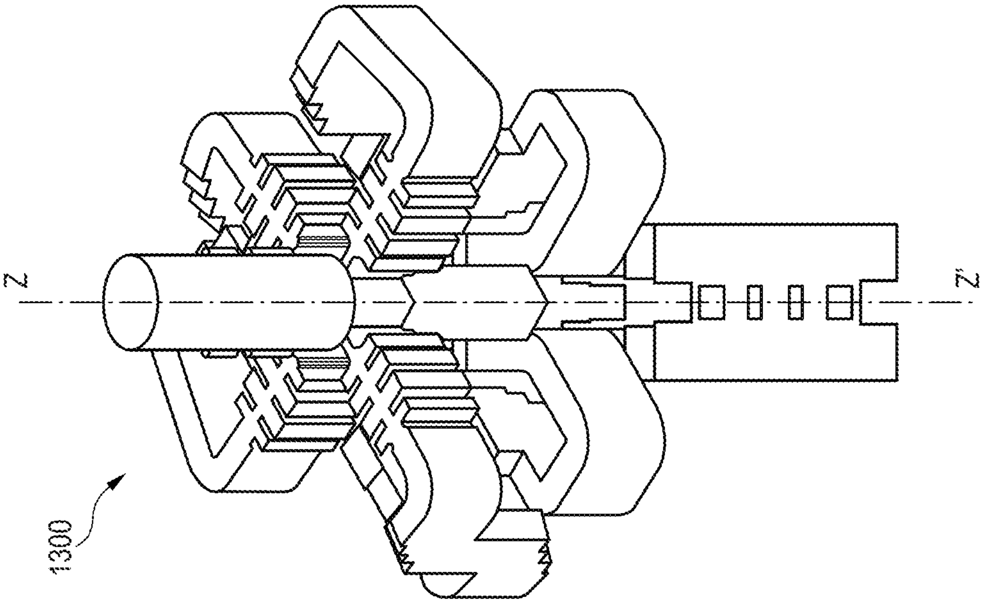
Figure 13A:
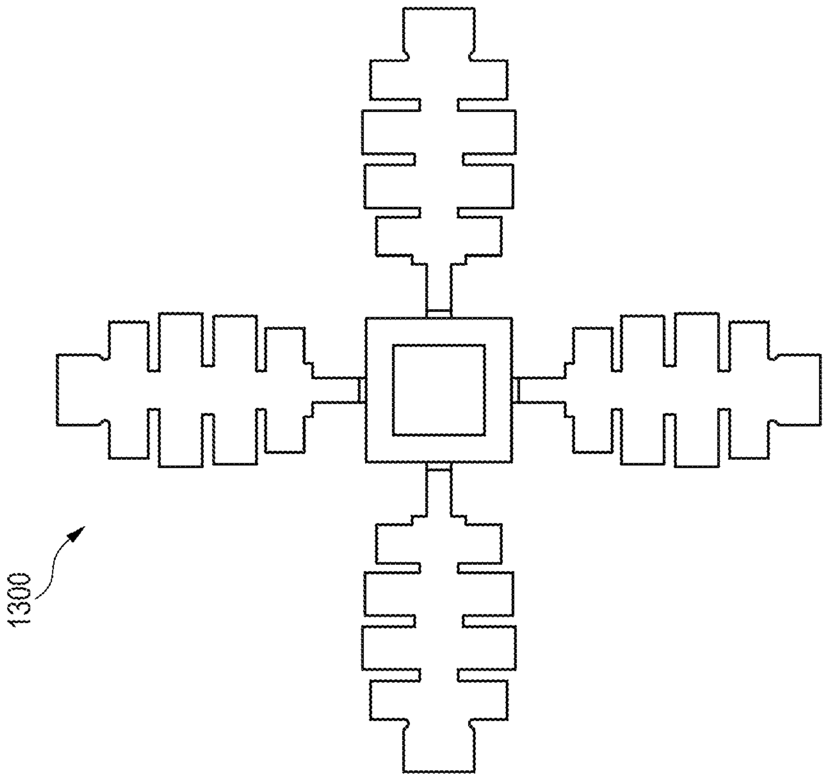

The electric field associated with this port definition for the OMT design is schematically represented in FIG. 12F.

Combining the coupler and the asymmetric OMT provides the following fields $$\begin{cases} \vec{E}_R \sim (\cos\theta E_{co} - \sin\theta E_{cx})\vec{x} - j(\sin\theta E_{co} + \cos\theta E_{cx})\vec{y} \\ \vec{E}_L \sim (\sin\theta E_{co} + \cos\theta E_{cx})\vec{x} + j(\cos\theta E_{co} - \sin\theta E_{cx})\vec{y} \end{cases} \quad (17)$$

One can see that circular polarization is achieved when the following condition is met $$\cos\theta E_{co} - \sin\theta E_{cx} = \sin\theta E_{co} + \cos\theta E_{cx} \quad (18)$$

Hence, the parameter θ is a solution of the following equation $$\tan\theta = \frac{\sin\theta}{\cos\theta} = \frac{E_{co} - E_{cx}}{E_{co} + E_{cx}} \quad (19)$$

One can note that tan θ<1. Hence, θ<45°, which means that the unbalanced coupler always has to send more power to the coupled port than to the direct port.

With equation (19), one can evaluate the required power unbalance to design a suitable coupler for a given OMT design knowing the level of undesired field component $E^{cx}$ introduced by the two-probe design. To illustrate, for the reference square OMT presented above, $E^{cx}$ is around −17 dB at 19 GHz. This corresponds to a coupler with −4.4 dB to the direct port and −1.9 dB to the coupled port. For the asymmetric OMT presented above, $E^{cx}$ is around −13 dB at 19 GHz. This corresponds to an unbalanced coupler with −5.5 dB to the direct port and −1.4 dB to the coupled port. Of course, those values provide only a starting point that needs to be further optimized as the level of undesired field component as well as the power levels of the unbalanced directional coupler vary with frequency. Thus, a compromise has to be found to achieve good performance over a broad frequency band.

For linear-polarization feeds, one may apply a similar approach feeding the asymmetric OMT with an unbalanced 180° directional coupler.

Other possible designs for waveguide portions according to embodiments of the disclosure include OMTs with an asymmetric common waveguide section spreading partly over the probing section and outside the probing section.

In addition, all designs discussed had a short-circuiting wall closing the probing section on one hand, opposite to the side connecting typically to other waveguide components such as a horn antenna. In some implementations, this short-circuiting wall may be displaced and the asymmetric common waveguide section may also extend in that direction.

Another option for waveguide portions according to embodiments of the disclosure is to combine two asymmetric common waveguide sections with different aspect ratios. Therein, one section may have an aspect ratio smaller than one while the other may have an aspect ratio higher than one. These combinations may be considered to enhance the overall feed performance by reducing the probe-to-probe coupling and increasing the cross-polarization discrimination simultaneously.

Notably, the common characteristic of all waveguide portions according to embodiments of the disclosure is to have an asymmetric common waveguide portion in the probing area or in its vicinity.

The above description relates to a waveguide component for use in an OMT or an OMJ. The present disclosure is understood to likewise relate to such OMT and OMJ. That is, the present disclosure also relates to an OMT comprising the waveguide component described above. The OMT may be configured to extract and/or excite the desired electromagnetic fields in the frequency band of operation. Further, the present disclosure also relates to an OMJ comprising the waveguide component described above. The OMJ may be configured to extract and/or excite the desired electromagnetic fields in one of the frequency bands of operation, with the electromagnetic fields in remaining bands passing through the waveguide component substantially unaffected.

Yet further, the present disclosure also relates to a system comprising the waveguide component described above and an unbalanced coupler connected to the coupling probes. In this system, simultaneously feeding the coupling probes with unbalanced amplitude and a phase shift of ±90° may allow to achieve left-hand and right-hand circularly polarized electric fields. Simultaneously feeding the first and second probes with unbalanced amplitude and a phase shift of ±180° may allow to achieve horizontal and vertical linearly polarized electric fields with reduced probe-to-probe coupling.

Finally, the present disclosure also relates to a system comprising the waveguide component described above and filters connected to the coupling probes.

It should be noted that the features of the apparatus described above may correspond to respective method (e.g., manufacturing method) features that may not be explicitly described, for reasons of conciseness, and vice versa. The disclosure of the present document is considered to extend also to such method and vice versa.

Thus, while a waveguide component in accordance with embodiments of the invention has been described above, the present disclosure likewise relates to a method of manufacturing such waveguide component. An example of such method may include the following steps: A step of providing a common waveguide with a longitudinal direction, comprising at least a first portion and a second portion with different cross-sections, wherein the second portion of the common waveguide has a cross-section with a two-fold rotational symmetry. And a step of providing two coupling probes, in a plane orthogonal to the longitudinal direction, with the coupling probes arranged to couple to different polarization components of an electromagnetic field present in the common waveguide.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

The invention claimed is:

1. A waveguide component for an orthomode junction or an orthomode transducer, the waveguide component comprising:

a common waveguide with a longitudinal direction, the common waveguide comprising at least a first portion and a second portion with different cross-sections; and two coupling probes, each arranged orthogonally to the longitudinal direction, wherein the coupling probes are further arranged to couple to different polarization components of an electromagnetic field present in the common waveguide, wherein the second portion of the common waveguide has a cross-section with at most two-fold rotational symmetry, wherein the cross-section of the second portion of the common waveguide has two orthogonal symmetry axes, and wherein the orthogonal symmetry axes of the cross-section of the second portion of the common waveguide are rotated with respect to axes of the coupling probes by substantially 45°.

2. The waveguide component according to claim 1, wherein the first portion of the common waveguide has a cross-section with a rotational symmetry of order 4 or a multiple of 4.

3. The waveguide component according to claim 1, wherein the cross-section of the first portion of the common waveguide has four symmetry axes that cross each other at a center of the cross-section and that are angularly spaced at 45 degrees from each other.

4. The waveguide component according to claim 1, wherein the cross-section of the first portion of the common waveguide has circular or square shape and the cross-section of the second portion of the common waveguide has a shape of any one of an ellipse, a rhombus, a circle that is chamfered on both sides on one axis, a square that is chamfered on both sides on one axis, a circle with protrusions on both sides on one axis, or a square with protrusions on both sides on one axis.

5. The waveguide component according to claim 1, wherein the waveguide component comprises exactly two coupling probes.

6. The waveguide component according to claim 1, wherein the two coupling probes are arranged such that they have a common symmetry plane orthogonal to the longitudinal direction of the common waveguide.

7. The waveguide component according to claim 6, wherein the common symmetry plane intersects the common waveguide in the first portion or the second portion.

8. The waveguide component according to claim 1, wherein the axes of the two coupling probes are substantially orthogonal to each other.

9. The waveguide component according to claim 1, wherein the common waveguide is oriented relative to the coupling probes such that a longer one of the two orthogonal symmetry axes of the cross-section of the second portion of the common waveguide is arranged between the coupling probes.

10. The waveguide component according to claim 9, wherein an aspect ratio of the two orthogonal symmetry axes of the second portion of the common waveguide and a length of the second portion of the common waveguide are chosen such that, for a given wave number of the electromagnetic field, an asymmetry of the orthogonal polarization components of the electromagnetic field introduced by the second portion of the common waveguide substantially cancels an undesired polarization component of the electromagnetic field introduced by a two-probe design of the waveguide component.

11. The waveguide component according to claim 1, wherein the common waveguide is oriented relative to the coupling probes such that a shorter one of the two orthogonal symmetry axes of the cross-section of the second portion of the common waveguide is arranged between the coupling probes.

12. The waveguide component according to claim 11, wherein an aspect ratio of the two orthogonal symmetry axes of the second portion of the common waveguide and a length of a second portion of the common waveguide are chosen such that, for a given wave number of the electromagnetic field, an asymmetry of the orthogonal polarization components of the electromagnetic field introduced by a second portion of the common waveguide substantially cancels a probe-to-probe coupling of the electromagnetic field introduced by a two-probe design of the waveguide component.

13. An orthomode transducer comprising the waveguide component according to claim 1 and being configured to extract and/or excite desired electromagnetic fields in a frequency band of operation.

14. An orthomode junction comprising the waveguide component according to claim 1 and being configured to extract and/or excite desired electromagnetic fields in one of a frequency bands of operation, with the electromagnetic fields in remaining bands passing through the waveguide component substantially unaffected.

15. A system comprising the waveguide component according to claim 1 and an unbalanced coupler connected to the coupling probes.

16. A system comprising the waveguide component according to claim 1 and filters connected to the coupling probes.

17. A method of manufacturing a waveguide component in an orthomode junction or an orthomode transducer, the method comprising:

providing a common waveguide with a longitudinal direction, the common waveguide comprising at least a first portion and a second portion with different cross-sections, wherein the second portion of the common waveguide has a cross-section with at most two-fold rotational symmetry; and providing two coupling probes, in a plane orthogonal to the longitudinal direction, with the coupling probes arranged to couple to different polarization components of an electromagnetic field present in the common waveguide, wherein the cross-section of the second portion of the common waveguide has two orthogonal symmetry axes, and wherein the orthogonal symmetry axes of the cross-section of the second portion of the common waveguide are rotated with respect to axes of the coupling probes by substantially 45°.

* * * * *